United States Patent [19]
Yonemitsu et al.

[11] Patent Number: 5,510,840
[45] Date of Patent: Apr. 23, 1996

[54] METHODS AND DEVICES FOR ENCODING AND DECODING FRAME SIGNALS AND RECORDING MEDIUM THEREFOR

[75] Inventors: Jun Yonemitsu; Yoichi Yagasaki, both of Kanagawa, Japan

[73] Assignee: Sony Corporation, Japan

[21] Appl. No.: 441,397

[22] Filed: May 15, 1995

Related U.S. Application Data

[63] Continuation of Ser. No. 98,280, Aug. 30, 1993, abandoned.

[30] Foreign Application Priority Data

Dec. 27, 1991 [JP] Japan .................................. 3-346718

[51] Int. Cl.$^6$ ....................................................... H04N 7/13
[52] U.S. Cl. ........................... 348/402; 348/416; 348/431
[58] Field of Search .................................. 348/400–410, 348/415–421, 426–432; H04N 7/13

[56] References Cited

U.S. PATENT DOCUMENTS

| | | | |
|---|---|---|---|
| 4,442,454 | 4/1984 | Powell | 348/625 |
| 4,800,426 | 1/1989 | Glenn | 348/474 |
| 4,849,812 | 7/1989 | Borgers et al. | 358/133 |
| 4,866,509 | 9/1989 | Guida | 348/471 |
| 5,091,782 | 2/1992 | Krause et al. | 358/135 |
| 5,227,878 | 7/1993 | Puri et al. | 348/416 |
| 5,253,056 | 10/1993 | Puri et al. | 348/415 |

FOREIGN PATENT DOCUMENTS

| | | | |
|---|---|---|---|
| 0443676A1 | 8/1991 | European Pat. Off. | H04N 5/92 |
| 0490799A1 | 6/1992 | European Pat. Off. | H04N 7/133 |
| 0499307A1 | 8/1992 | European Pat. Off. | H04N 7/133 |
| 0510972A2 | 10/1992 | European Pat. Off. | H04N 7/13 |
| 0536784A2 | 4/1993 | European Pat. Off. | H04N 7/13 |
| 55-55682 | 4/1980 | Japan | H04N 7/13 |
| 58-137379 | 8/1983 | Japan | H04N 7/13 |
| 61-269475 | 11/1986 | Japan | H04N 7/00 |
| 92/03889 | 8/1991 | WIPO | H04N 7/133 |

OTHER PUBLICATIONS

Document, AVC–400 Nov. 1992 International Organisation for Standardisation Organisation Internationale de Normalisation ISO–IEC/JTC1/SC29/WG11 Coded Representation of Picture and Audio Information "Test Model 3" Draft.

Philips Journal of Research vol. 44, No. 2/3, Jul. 1989, Eindhoven NL. pp. 345–364 XP000053343 DE with 'Motion–Adaptive Intraframe Transform Coding of Video Signals'.

Yasuda, Hiroshi, "International Standard of Multimedia Coding", Jun. 30, 1991, Maruzen, pp. 109 to 110, 130 to 139, and 140 to 147.

Ota, Mitsumi, "Problems on Studies Technologies in MPEG Phase–2" vol. 20, No. 4, Aug. 1991 (Tokyo) pp. 324–329.

Uekura, Kazuto, "Introduction of In–field/In–frame Applied DCT in Coding of Dynamic Image for Storage Media", vol. 20, No. 4, Aug. 1991 (Tokyo) pp. 346–351.

Primary Examiner—Victor R. Kostak
Attorney, Agent, or Firm—Limbach & Limbach; Charles P. Sammut

[57] ABSTRACT

A motion vector detection circuit detects the motion vector for each macro-block between an odd field and an even field. An encoding system decision circuit decides the type of the encoding system, that is if the encoding system is a field-based encoding system or a frame-based encoding system, based on a median of a motion vector. A control circuit controls gates and changeover switches, in accordance with the encoding system type as decided by the decision system, for generating a field-based reference picture or a frame-based reference picture from buffer memories. The circuitry from an additive node to a VLC circuit finds difference data between the reference picture and the picture to be encoded, while transforming the difference data by discrete cosine transform and variable length encoding the transformed data. The VLC circuit sets the encoding system type as a flag in a header of a predetermined hierarchical layer of a bit stream. By the above operation, any interlaced picture may be encoded efficiently, whether the picture includes little motion or abundant motion or includes both little motion and abundant motion in combination. A picture data decoding device detects the flag and executes decoding by changing over field-based decoding to frame-based decoding or vice versa depending on the flag for reproducing the picture data.

19 Claims, 21 Drawing Sheets

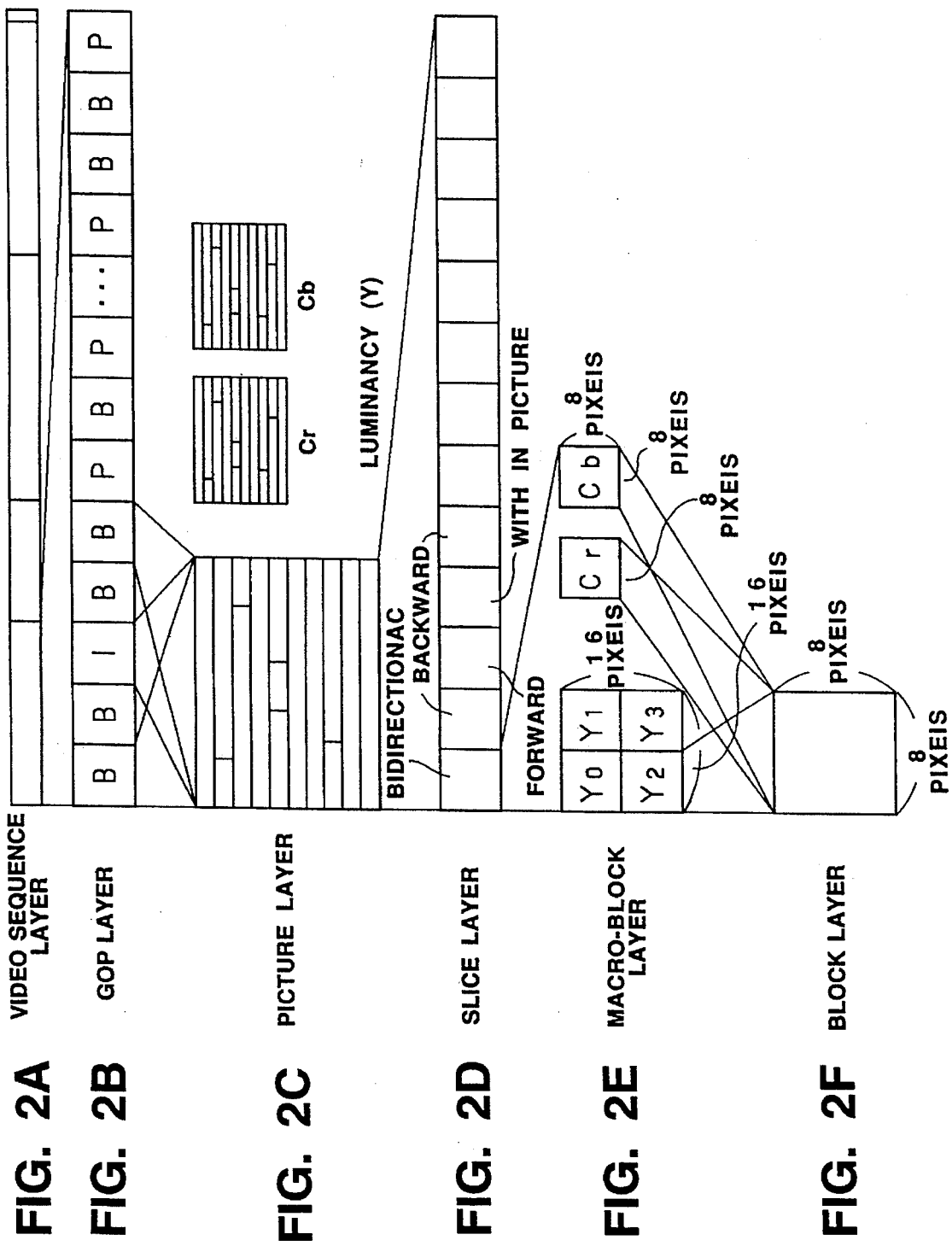

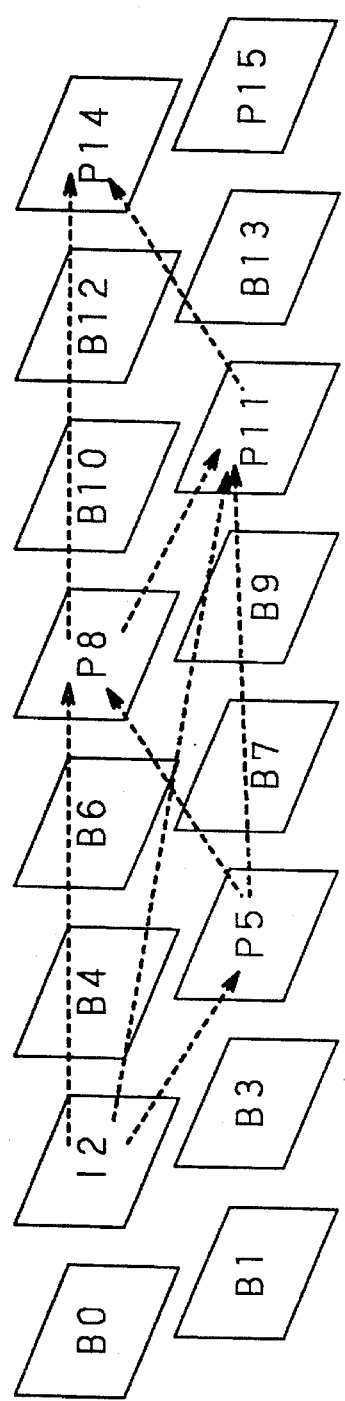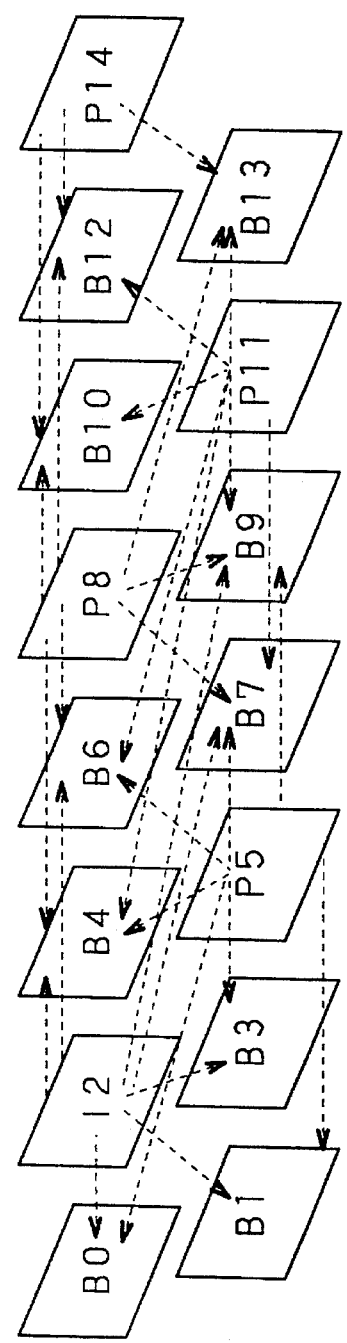
FIG. 15A
FIG. 15B

METHODS AND DEVICES FOR ENCODING AND DECODING FRAME SIGNALS AND RECORDING MEDIUM THEREFOR

This is a continuation of application Ser. No. 08/098,280 filed on Aug. 30, 1993 abandoned.

TECHNICAL FIELD

This invention relates to an encoding method and an encoding device for high efficiency encoding of picture signals by orthogonal transform, a picture data decoding method and a picture data decoding device for decoding picture data resulting from high efficiency encoding, and a picture recording medium.

BACKGROUND ART

According to a draft, for standardization for the high efficiency encoding system for picture signals, as proposed by the Moving Picture Experts Group (MPEG), a high efficiency encoding system for picture signals for a so-called digital storage medium is prescribed. The following is the principle of the high efficiency encoding system by MPEG.

That is, with this high efficiency encoding system, a difference is first taken between pictures to lower the redundancy along the time scale. Subsequently, discrete cosine transform (DCT) and variable length coding (VLC) are carried out to lower the redundancy along the spatial axis.

The redundancy along the time scale is first explained.

In general, in consecutive moving pictures, a picture under consideration, that is a picture at a given time point, bears strong similarity to temporally previous and temporally succeeding pictures. Consequently, by taking a difference between a picture now to be encoded and a temporally forward picture, and by transmitting the difference, as shown in FIG. 1, it becomes possible to diminish the redundancy along the time scale and hence the amount of the information to be transmitted. The picture encoded in this manner is termed a predictive-coded picture, P-picture or a P-frame, as later explained.

Similarly, by taking a difference between a picture now to be encoded and a temporally forward picture, a temporally backward picture or a interpolated picture produced from the temporally forward and temporally backward pictures, and transmitting the smallest of the differences, it becomes possible to diminish the redundancy along the time scale and hence the amount of the information to be transmitted. The picture encoded in this manner is termed a bidirectionally predictive-coded picture, B-picture or a B-frame, as later explained. In FIG. 1, a picture indicated by I is an intra-coded picture as later explained, while pictures indicated by P and B in the figure are the above-mentioned P-picture and the B-picture, respectively.

For producing prediction pictures, so-called motion compensation is performed. According to the motion compensation, a 16×16 pixel block, referred to herein as a macro-block, made up of unit blocks each consisting of 8×8 pixels, is prepared, one of those macro-blocks of the previous picture which is in the vicinity of a macro-block under consideration and has the smallest of the differences is retrieved and a difference between the macro-block under consideration and the macro-block thus retrieved is taken to diminish the volume of data to be transmitted. For example, with the above-mentioned predictive-coded picture or P-picture, one of picture data produced by taking a difference between the prediction picture and the motion-compensated prediction picture and picture data produced by not taking a difference between the prediction picture and the motion-compensated prediction picture, whichever is smaller in data volume, is selected and encoded on the basis of the 16×16 pixel macro-block as a unit.

However, in such case, a larger amount of data needs to be transmitted for a picture portion which has appeared from behind a moving object. In this consideration, with the above-mentioned bidirectionally coded picture or B-picture, one of picture data corresponding to the difference between the picture data now to be encoded and the decoded and motion-compensated temporally forward picture data, picture data corresponding to the difference between the picture data now to be encoded and the decoded and motion-compensated temporally backward picture data, picture data corresponding to the difference between the picture data now to be encoded and interpolated picture data prepared by adding the decoded and motion-compensated temporally backward and temporally forward picture data and the picture data for which the difference has not been taken, that is the picture now to be encoded, whichever has the smallest data volume, is encoded.

The redundancy along the spatial axis is hereinafter explained.

The difference of the picture data is not transmitted directly, but is processed with discrete cosine transform (DCT) from one 8×8 pixel unit block to another. The DCT represents a picture depending on which frequency components of a cosine function are contained in a picture and in which amounts these frequency components are contained, instead of on the pixel level. For example, by two-dimensional DCT, picture data of the 8×8 unit block is transformed into a 8×8 coefficient block of the components of the cosine function. For example, picture signals of a natural scene as imaged by a television camera frequently represent smooth signals. In such case, the picture data volume may be efficiently diminished by processing the picture signals with DCT.

The data structure handled by the above-mentioned encoding system is shown in FIG. 2. The data structure shown in FIG. 2 includes, from the lower end on, a block layer, a macro-block layer, a slice layer, a picture layer, a group-of-picture (COP) layer and a video sequence layer. The data structure is now explained, from the lower layer on, by referring to FIG. 2.

First, as to the block layer, each block of the block layer is composed of 8×8 neighboring pixels, that is 8 pixels of 8 lines, of luminance or color difference. The above-mentioned DCT is performed for each of these unit blocks.

The macro-blocks of the macro-block layer are made up of left and right upper and lower four neighboring luminance blocks or unit luminance blocks Y0, Y1, Y2 and Y3 and color difference blocks or unit color difference blocks Cr, Cb, which are at the same positions on the picture as the luminance blocks, as shown at E in FIG. 2. These blocks are transmitted in the sequence of Y0, Y1, Y2, Y3, Cr and Cb. Which picture is used as a prediction picture, that is a reference picture of difference taking, or whether or not a difference need not be transmitted, is decided on the macro-block basis.

The above-mentioned slice layer is made up of one or more macro-blocks arrayed in the picture scanning sequence, as shown at D in FIG. 2. At a header of the slice, the difference of the dc component and the motion vector in the picture are reset. On the other hand, the first macro-block has data indicating the position within the picture, such that reversion may be made in case of an error occurrence. Consequently, the length or the starting position of the slice are arbitrary and may be changed depending on the error state on the transmission channel.

As to the picture layer, each picture is made up of at least one or plural slice(s), as shown at C in FIG. 2. Each picture may be classified into the intra-coded picture (I-picture or I-frame), the predictive-coded picture (P-picture or P-frame), bidirectionally coded picture (B-picture or B-frame) and the DC intra-coded picture (DC coded (D) picture).

It is noted that, for encoding the intra-coded picture or I-picture, only the information which is closed within each picture is employed. In other words, for decoding the I-picture, only the information contained in the picture concerned is employed. In effect, or encoding a picture by intra-coding, the picture is directly discrete cosine transformed without taking a difference. Although this encoding system usually has a poor efficiency, random accessing or high-speed reproduction may be enabled by inserting this picture at arbitrary places.

As to the predictive-coded picture (P-picture), the I-picture or the P-picture positioned temporally previously at an input and already decoded is employed as a prediction picture (reference picture in difference taking). In effect, encoding the difference between the prediction picture and the motion-compensated prediction picture or directly encoding the prediction picture, that is without taking the difference, whichever is more efficient, is selected on the macro-block basis.

As to the bidirectionally coded picture or B-picture, three types of pictures, namely a temporally previously positioned and already decoded I-picture, a temporally previously positioned and already decoded P-picture and an interpolated picture obtained from these pictures, are employed as a prediction picture. In this manner, encoding of the difference between the prediction picture and the motion-compensated picture and the intra-coding, whichever is more efficient, may be selected on the macro-block basis.

The DC intra coded picture is the intra-coded picture which is made up only of DC coefficients in DCT and which cannot exist in the same sequence as the remaining three pictures.

The GOP layer is made up of one or plural I-picture(s) and zero or plural non-I-pictures, as shown at B in FIG. 2. The distance between the I-pictures, such as 9, or the distance between the I-pictures or the B-pictures, such as 3, is arbitrary. Besides, the distance between the I-pictures or between the B-pictures may be changed within the inside of the GOP layer.

The video sequence layer is made up of one or plural GOP layer(s) having the same picture size or the same picture rate, as shown at A in FIG. 2.

For transmitting the moving picture standardized in accordance with the high efficiency encoding system by MPEG, as described above, picture data produced by compressing a picture in itself are transmitted, and subsequently a difference between the picture and the motion-compensated same picture is transmitted.

However, the following problem has been found to be raised when the picture to be encoded is an interlaced picture resulting from an interlaced scanning.

That is, if a picture resulting from the interlaced scanning is encoded on the field-by-field basis, a difference in the vertical positions is alternately incurred from field to field. Consequently, when transmitting a stationary portion of a moving picture, difference data is produced at a boundary between the fields, notwithstanding that the picture portion remains stationary. Since the difference data needs be transmitted, the encoding efficiency is lowered at the stationary portion of the moving picture.

Also, if a picture produced by interlaced scanning is encoded on the field-by-field basis, since each block is formed on the field-by-field basis, the interval between pictures becomes broader than if the block is formed on the frame-by-frame basis, with the result that correlation and hence the coding efficiency are lowered.

On the other hand, if the picture resulting from interlaced scanning is encoded on the frame-by-frame basis, the moving portion in the frame is blurred in the shape of a comb. For example, if a moving object, such as a motor vehicle, is present ahead of a stationary object, the motor vehicle, which is the moving portion, becomes blurred when viewed as a frame, as indicated at KS in FIG. 4, because of motion between fields. The result is that high-frequency components, not present in the original picture, are transmitted, thus lowering the encoding efficiency.

Besides, with the frame-by-frame encoding, since encoding is made on the basis of two consecutive fields making up a frame as a unit, predictive coding cannot be employed between the two consecutive fields. Thus the minimum distance of predictive coding becomes a frame or two fields. Consequently, as compared to the field-by-field coding with the minimum predictive coding distance of one field, the frame-by-frame encoding is disadvantageous in respect to a picture having a fast or intricate motion.

As discussed in the foregoing, there are occasions wherein the field-by-field encoding is lowered in encoding efficiency with corresponding rise in encoding efficiency of the frame-by-frame encoding, or wherein the frame-by-frame encoding is lowered in encoding efficiency with corresponding rise in encoding efficiency of the field-by-field encoding.

In view of the above-described status of the art, it is an object of the present invention to provide a picture data encoding method and a picture data encoding device whereby a picture produced by interlaced scanning may be encoded efficiently whether the picture is replete with motion, the picture shows only little motion or the picture replete with motion and the picture showing only little motion co-exist, and a picture data decoding method and a picture data decoding device for decoding picture data encoded by the encoding method and the encoding device.

DISCLOSURE OF THE INVENTION

A first picture data encoding method for encoding interlaced picture signals according to the present invention comprises deciding if encoding of picture signals is to be executed on the field-by-field basis or on the frame-by-frame basis, encoding the picture signals on the field-by-field basis or on the frame-by-frame basis, depending on the results of decision, for generating encoded picture data, and appending discrimination data to the encoded picture data based on the results of decision, the discrimination data indicating if the encoded picture data have been encoded on the field-by-field basis or on the frame-by-frame basis.

According to a second picture data encoding method for encoding interlaced picture signals according to the present invention, encoded picture data has a hierarchical structure and the discriminating data is provided at a portion of a header of a predetermined hierarchical layer of the encoded picture data.

According to a third picture data encoding method for encoding interlaced picture signals according to the present invention, the decision in the first picture data encoding method is executed based on the motion vector of each macro-block.

A fourth picture data encoding method for encoding interlaced picture signals according to the present invention comprises encoding picture signals on the field-by-field basis for generating encoded picture data, and appending discrimination data indicating that the encoded picture data have been encoded on the field-by-field basis to the encoded picture data.

According to a fifth picture data encoding method for encoding picture signals according to the present invention, encoded picture data has a hierarchical structure in the fourth picture data encoding method and the discriminating data is provided at a portion of a header of a predetermined hierarchical layer of the encoded picture data.

A sixth picture data encoding method for encoding interlaced picture signals according to the present invention comprises encoding the picture signals on the frame-by-frame basis for generating encoded picture data, and appending discrimination data indicating that the encoded picture data have been encoded on the frame-by-frame basis to said encoded picture data.

According to a seventh picture data encoding method for encoding picture signals according to the present invention, encoded picture data has a hierarchical structure in the sixth picture data encoding method, and the discriminating data is provided at a portion of a header of a predetermined hierarchical layer of the encoded picture data.

A first picture data decoding method for decoding picture data encoded with a block consisting in a two-dimensional array of plural pixels as an encoding unit comprises detecting a flag provided at a portion of a header for the picture data for discriminating if the picture data have been encoded on the field-by-field basis or on the frame-by-frame basis, and adaptively switching between field-based decoding and frame-based decoding based on the flag.

According to a second picture data decoding method according to the present invention, picture data has a hierarchical structure, in the first picture data decoding method, the flag is detected from a header of a predetermined hierarchical layer of the picture data, and switching is adaptively made between field-based decoding and frame-based decoding for each of predetermined hierarchical layers based on the flag.

A third picture data decoding method for decoding picture data encoded with a block consisting in a two-dimensional array of plural pixels as an encoding unit according to the present invention comprises detecting a flag provided at a portion of a header for the picture data for discriminating if the picture data have been encoded on the field-by-field basis, and decoding the picture data based on the flag on the field-by-field basis.

According to a fourth picture data decoding method according to the present invention, the picture data in the third picture data decoding method has a hierarchical structure, and the flag is detected from a header of a predetermined hierarchical layer.

A fifth picture data decoding method for decoding picture data encoded with a block consisting in a two-dimensional array of plural pixels as an encoding unit according to the present invention comprises detecting a flag provided at a portion of a header for the picture data for discriminating if the picture data have been encoded on the frame-by-frame basis, and decoding the picture data based on the flag on the frame-by-frame basis.

According to a sixth picture data decoding method according to the present invention, the picture data in the fifth picture data decoding method has a hierarchical structure, and the flag is detected from a header of a predetermined hierarchical structure of the picture data.

A first picture data encoding device for encoding picture signals with a block consisting in a two-dimensional array of plural pixels as an encoding unit according to the present invention comprises decision means for deciding if encoding of the picture signals is to be executed on the field-by-field basis or on the frame-by-frame basis, encoding means for encoding the picture signals on the field-by-field basis or on the frame-by-frame basis, depending on the results of decision by the decision means, for generating encoded picture data, and appending means for appending discrimination data to the encoded picture data based on the results of decision, the discrimination data indicating if the encoded picture data have been encoded on the field-by-field basis or on the frame-by-frame basis.

With the second picture data encoding device according to the present invention, the appending means in the first picture data encoding device include a variable length encoding circuit.

A third picture data encoding device according to the present invention further comprises, in the first picture data encoding device, motion vector detecting means for detecting the motion vector between first and second fields of a current frame to be encoded, the decision means executing decision based on the motion vector from the motion vector detecting means.

A fourth picture data encoding device for executing block-based encoding of picture signals consisting in an interlaced two-dimensional array of pixels for generating encoded picture data having a hierarchical structure, according to the present invention, comprises motion vector detecting means for detecting the motion vector between first and second fields of a current frame of the picture signals to be encoded, from one macro-block to another, decision means for deciding if encoding of the picture signals is to be executed on the field-by-field basis or on the frame-by-frame basis, based on the magnitude of a median of the motion vector from the motion vector detecting means, as found over a predetermined hierarchical layer, encoding means for encoding the picture signals on the field-by-field basis or on the frame-by-frame basis, based on the results of decision from the decision means, and variable length coding means for variable length encoding the encoded picture data and discriminating data indicating that the encoded picture data have been encoded on the field-by-field basis or on the frame-by-frame basis, based on the results of decision from the decision means, and for causing said discriminating data to be appended to a header of a predetermined hierarchical layer of the picture data.

A first picture data decoding device for decoding picture data encoded with a block consisting of a two-dimensional array of plural pixels as an encoding unit according to the present invention comprises detecting means for detecting a flag provided at a portion of a predetermined hierarchical layer of the picture data for indicating whether the picture contained in the hierarchical layer has been encoded on the field-by-field basis or on the frame-by-frame basis, and decision means for deciding, based on the flag from the detecting means, whether or not decoding of the picture data is possible.

A second picture data decoding device according to the present invention comprises, in the first picture data decoding device, display means for displaying the results of decision from the decision means.

A third picture data decoding device according to the present invention comprises, in the first picture data decoding device, a variable length encoding circuit whereby the flag may be discriminated.

A fourth picture data decoding device for decoding picture data encoded with a block consisting in a two-dimensional array of plural pixels as an encoding unit according to the present invention comprises detecting means for detecting a flag provided at a portion of a predetermined hierarchical layer of the picture data for indicating whether the picture contained in the hierarchical layer has been encoded on the field-by-field basis or on the frame-by-frame basis, and decoding means for decoding the picture data by selecting, for each of hierarchical layers, one of field-based decoding or frame-based decoding depending on the flag from the detecting means.

A fifth picture data decoding device according to the present invention comprises, in the fourth picture data decoding device, a variable length encoding circuit whereby the flag may be discriminated.

A picture recording medium according to the present invention has recorded thereon encoded interlaced picture data encoded on the field-by-field basis or on the frame-by-frame basis, and discriminating data provided at a header of a predetermined hierarchical layer for indicating whether the encoded picture data have been encoded on the field-by-field basis or on the frame-by-frame basis.

BRIEF DESCRIPTION OF THE DRAWINGS

FIG. 2A, 2B, 2C, 2D, 2E, and 2F show the construction of a video frame in MPEG.

FIGS. 15A and 15B show a method showing another concrete motion prediction for the field-by-field encoding/decoding shown in FIG. 5.

BEST MODE FOR CARRYING OUT THE INVENTION

Figure 1:
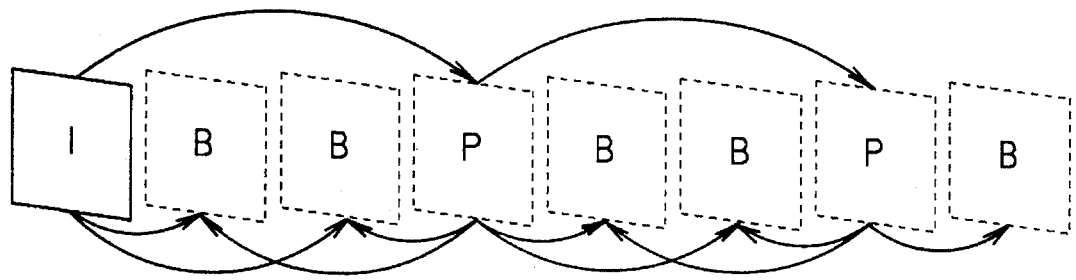
FIG. 1 shows the relation between pictures in MPEG.

By referring to the drawings, concrete embodiments of the present invention will be explained in detail.

1. Picture Data Encoding Method/Picture Data Decoding Method

The field-by-field and frame-by-frame encoding/decoding operations according to the present invention will be explained.

Figure 5:
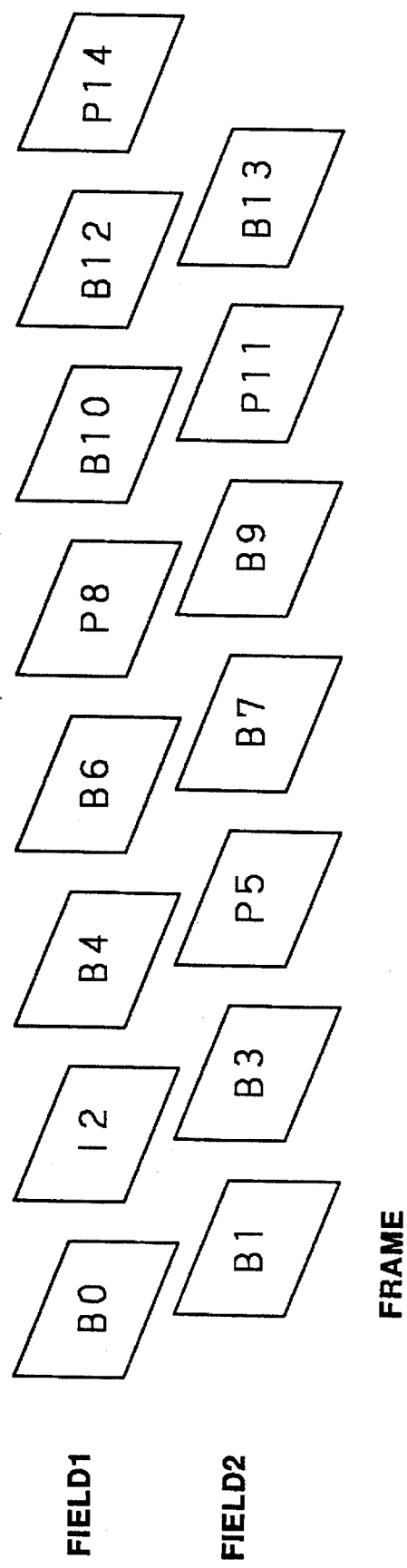
FIG. 5 shows a concrete example of field-by-field coding/encoding.

If the picture shown in FIG. 1 is a field-by-field picture, it may be represented as shown in FIG. 5, if its field-based construction is taken into account. In FIG. 5, an upper row denotes a first field, such as an odd-numbered field, and a lower row a second field, such as an even-numbered field. Two field temporally adjacent each other at an interval of 1/60 sec make up a frame. With the field-by-field encoding/decoding operation, each picture is encoded/decoded on the field-by-field basis.

Figure 6:
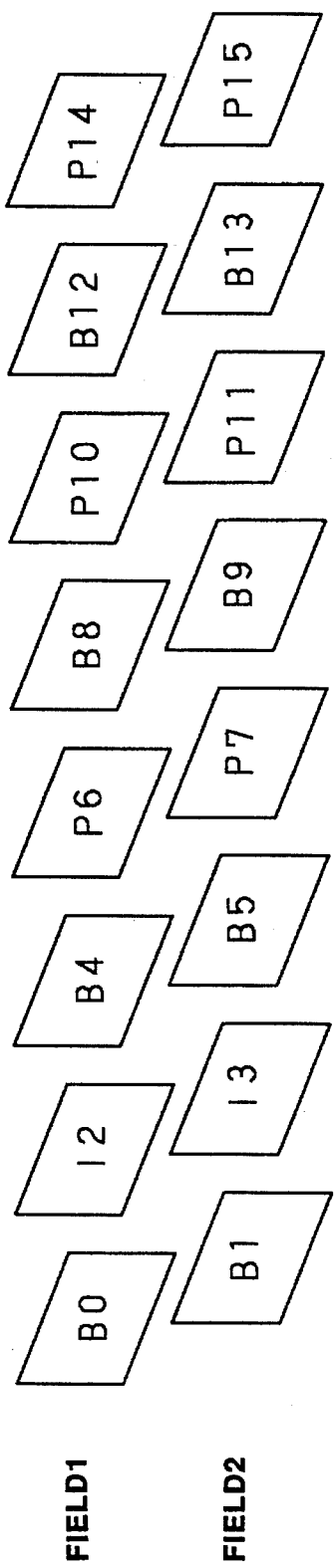
FIG. 6 shows another concrete example of field-by-field coding/encoding.

A concrete example in which a constructional pattern of the I-picture (intra-coded picture)/P-picture (predictive-coded picture)/B-picture(bidirectionally coded picture) in the GOP layer shown in FIG. 2B is changed, is shown in FIG. 6. In FIGS. 5 and 6, only the constructional pattern of the pictures in the GOP layer is changed, while FIGS. 5 and 6 are common in carrying out the encoding/decoding operations on the field-by-field basis. Meanwhile, if the encoding type is the same between the first and the second fields, as in FIG. 6, the first and the second fields may be encoded collectively, in which case the operation is the frame-by-frame encoding/decoding operation shown in FIG. 7.

Figure 7:
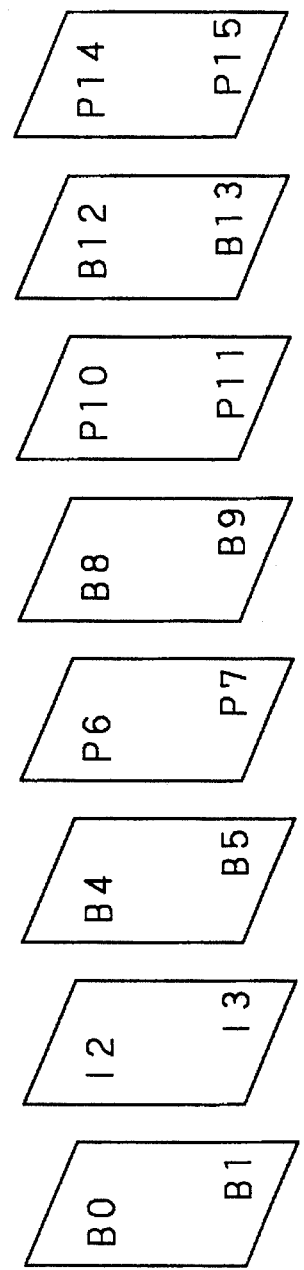
FIG. 7 shows a concrete example of frame-by-frame coding/encoding.
Figure 8:
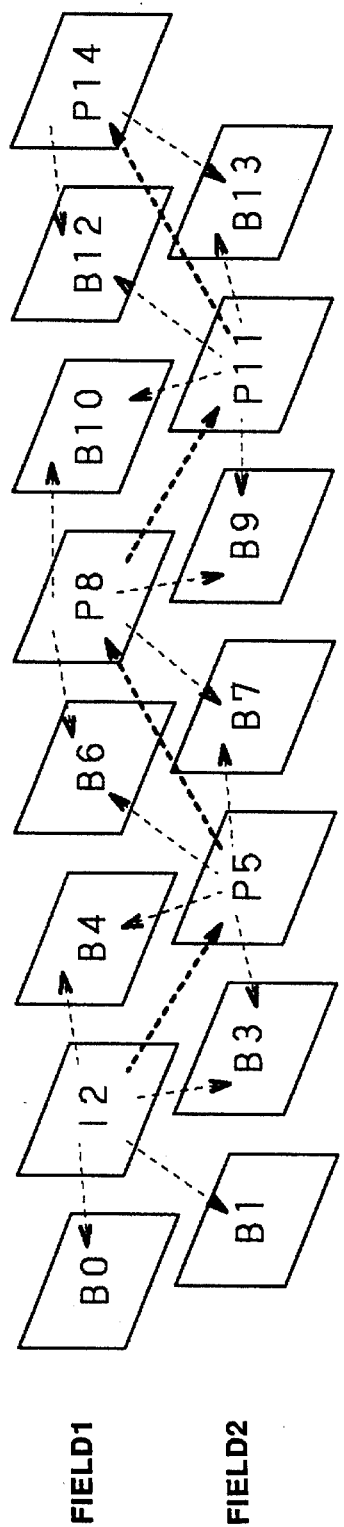
FIG. 8 shows a concrete method for motion prediction for the field-by-field encoding/decoding shown in FIG. 5.
Figure 9:
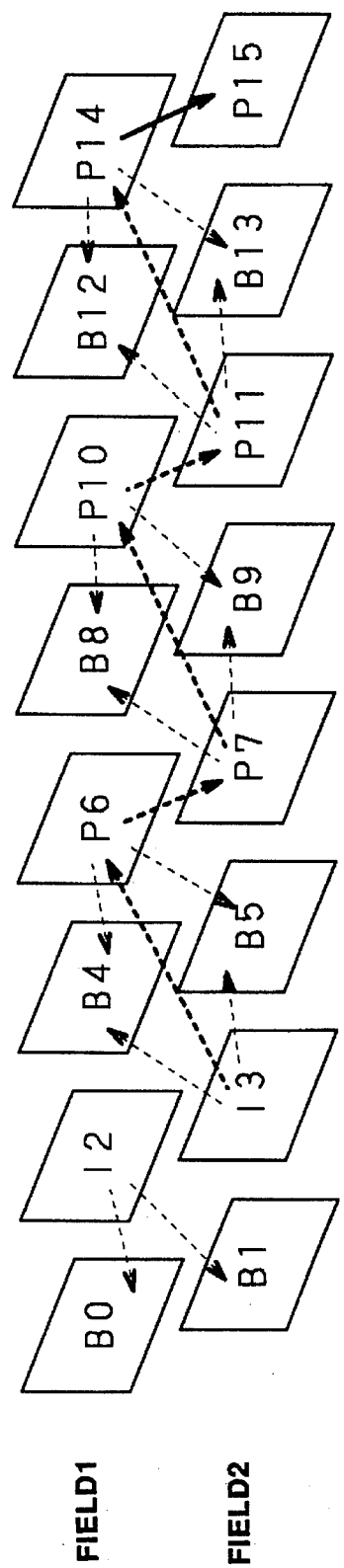
FIG. 9 shows a concrete method for motion prediction for the field-by-field encoding/decoding shown in FIG. 6.
Figure 10A:
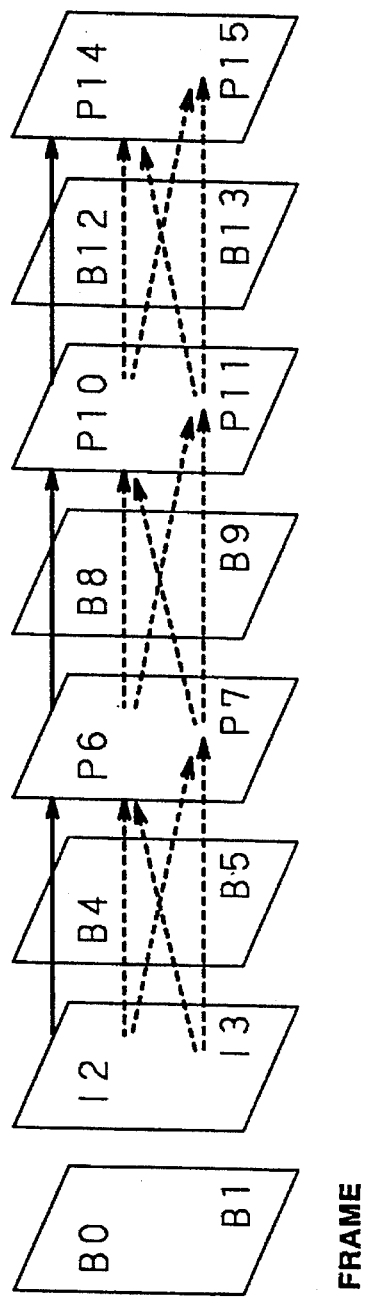
FIGS. 10A and 10B show a concrete method for motion prediction for the frame-by-frame encoding/decoding shown in FIG. 7.
Figure 10B:
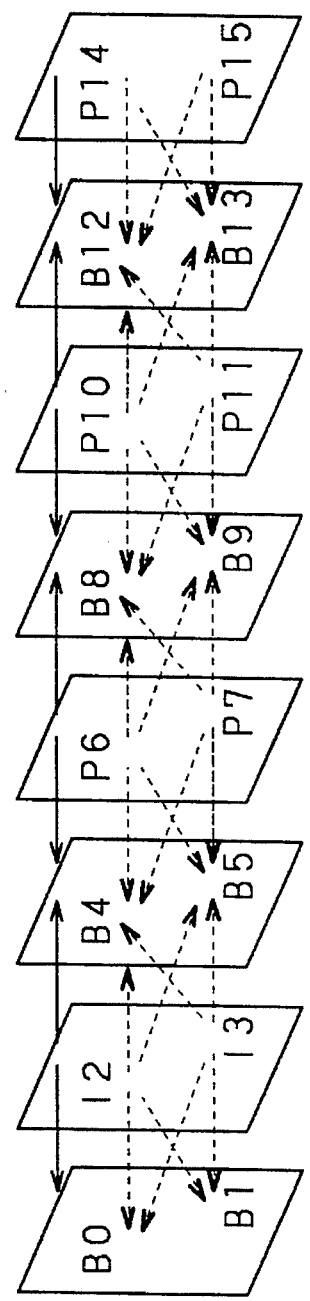

A variety of motion prediction and compensation operations may be implemented for the encoding/decoding operations shown in FIGS. 5, 6 and 7. Of these, simple concrete examples are shown in FIGS. 8, 9 and 10. In these figures, for example, in FIGS. 8 and 9, thick broken-lined arrows from picture I2 to picture I5 and from picture I3 to picture P6, indicate motion prediction to P-pictures. On the other hand, thin-lined arrows from picture I2 to picture B0 in FIGS. 8 and 9 indicate motion prediction to the B-pictures. In FIGS. 10A and 10B, solid-lined arrows indicate motion prediction of the frame-based macro-blocks, while broken-lined arrows indicate motion prediction of the field-based macro-blocks.

With the field-by-field encoding/decoding, the P-picture, such as the P-picture P5 shown in FIG. 8, employs a picture I2, which is positioned temporally previously and already decoded, as a prediction picture, that is a reference picture for difference taking, while the picture P8 employs a picture P5, which is positioned temporally previously and already decoded, as a prediction picture. The picture P6 shown in FIG. 9 employs a picture P6 as a prediction picture, while the picture P7 employs a picture P6 as a prediction picture. The B-picture, such as the picture B4 shown in FIG. 8, employs three pictures, that is picture I2, picture P5 and an interpolated picture of these pictures, as a prediction picture. The B-picture, such as the picture B4 shown in FIG. 9, employs three pictures, that is picture I3, picture P6 and an interpolated picture produced from both of these pictures, as a prediction picture.

On the other hand, with frame-by-frame encoding/decoding, a frame made up of P-pictures or frames, such as pictures P6 and P7 shown in FIG. 10A, employs a frame made up of pictures I2 and I3, as a prediction picture, while a frame made up of pictures P10 and P11 employs a frame made up of pictures P6 and P7, as a prediction picture. On the other hand, a frame made up of B-pictures or frames, such as pictures B4 and B5 shown in FIG. 10B, employs three frames, namely a frame made up of pictures I2 and I3, which are positioned temporally previously and already decoded, a frame made up of pictures P6 and P7, and an interpolated picture produced from both of these pictures, as a prediction picture.

As discussed in the foregoing, the field-by-field encoding/decoding operations and the frame-by-frame encoding/decoding operations are common in the encoding/decoding procedure. However, as will be explained subsequently, they differ in the block constitution and motion prediction/compensation.

(1) Block Constitution

Since the first and second fields are collectively encoded and decoded with the frame-by-frame encoding/decoding operations, it is possible to combine the first and second fields into a sole block. On the other hand, with the field-by-field processing, a block may be constituted by any one of these fields.

(2) Motion Prediction/Compensation

With frame-by-frame encoding/decoding operations, the encoding/decoding operations are performed with the first and second fields combined together, so that motion prediction towards the second field belonging to one and the same frame is not employed. However, with field-by-field processing, motion prediction from the first field to the second field is employed.

Figure 11:
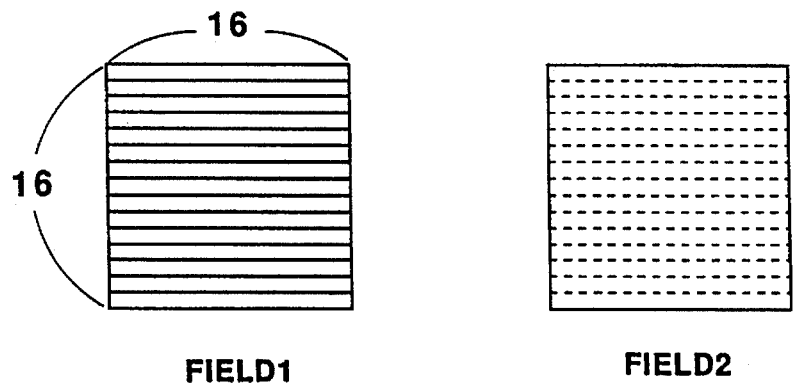
FIG. 11 shows a typical block construction in a macro-block for the field-by-field encoding/decoding.

Details of the above paragraphs (1) Block Constitution and (2) Motion Prediction/Compensation are explained. (1) Block Constitution FIG. 11 shows the constitution of inner blocks of the macro-block in the field-by-field encoding/decoding operations. As shown in FIG. 11, with the field-by-field encoding/decoding operations, the field-by-field macro-block is constituted solely by the first field or by the second field.

Figure 12A:
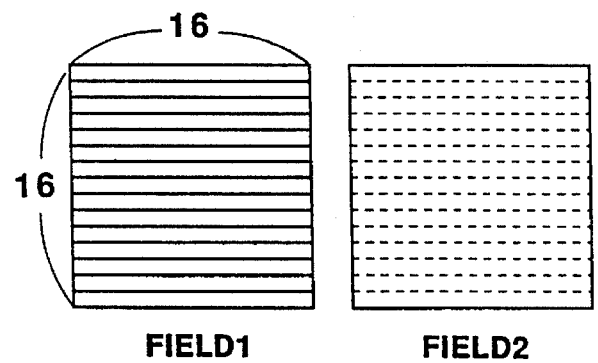
FIGS. 12A, 12B and 12C show a typical block construction in a macro-block for the frame-by-frame encoding/decoding.
Figure 12B:
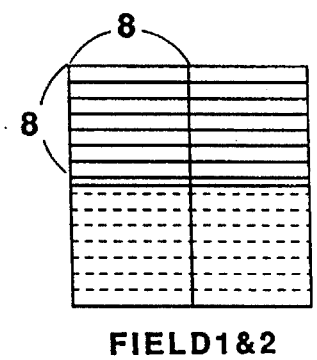
Figure 12C:
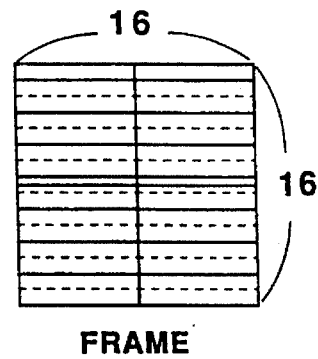

On the other hand, FIGS. 12A, 12B and 12C show the constitution of inner blocks of the macro-block in the frame-by-frame encoding/decoding operations. With the frame-by-frame encoding/decoding operations, a frame-by-frame macro-block shown in FIG. 12C may be employed in addition to the field-by-field macro-blocks shown in FIGS. 12A and 12B. That is, with the field-by-field macro-block, it is possible to divide a macro-block into upper and lower two blocks, with the upper two blocks being constituted solely by the first fields and the lower two blocks being constituted solely by the second fields, in addition to the first and second fields of the macro-block construction which are the same as in the field-by-field encoding/decoding operations shown in FIG. 11. On the other hand, the frame-by-frame macro-block is constituted by first and second fields, as shown in FIG. 12C.

In this manner, with the frame-by-frame encoding/decoding operations, a frame-by-frame macro-block may be employed in addition to the field-by-field macro-block in the field-by-field encoding/decoding operations.

Meanwhile, a switching between the field-by-field macro-block and the frame-by-frame macro-block as described in the foregoing may be realized by controlling readout addresses at the time of reading out blocks from buffer memories 7 and 8 based on the discrimination information for discrimination between the field-by-field encoding and the frame-by-frame encoding, as determined by an encoding system decision circuit 21 (FIG. 23) of the picture data encoding device as later explained. With a picture data decoding device as later explained, such switching may also be realized by detecting a flag recorded or superposed in an encoded bit stream received by a picture data encoding device etc. and deciding whether the encoding system is a field-by-field encoding system or a frame-by-frame encoding system, based on the detected flag, by an inverse variable length coding circuit 31 (FIG. 27), and transmitting the corresponding information to motion compensating circuits 42, 43 etc. for controlling the readout addresses of the buffer memories 37, 38.

Figure 13:
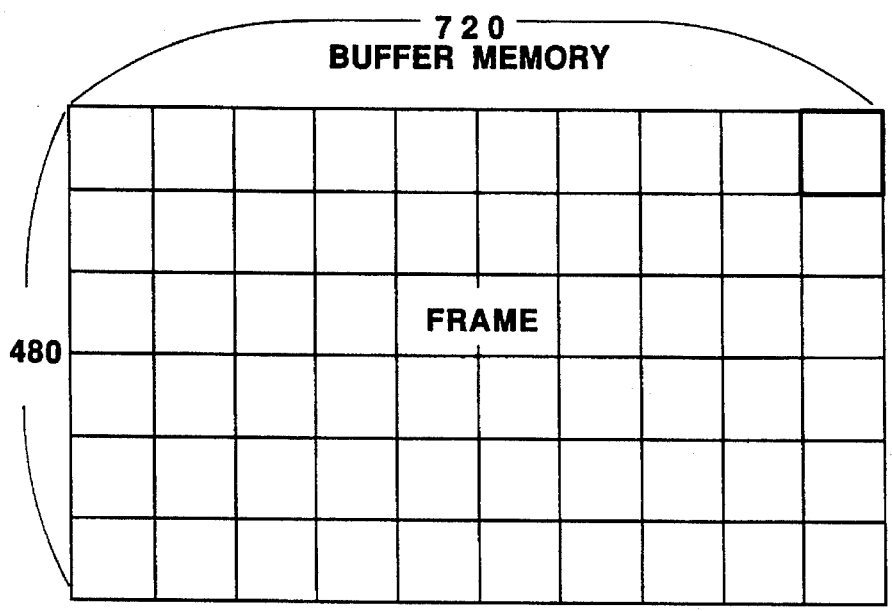
FIG. 13 shows a typical concrete construction of a buffer memory of a picture data encoding device according to the present invention.
Figure 14:
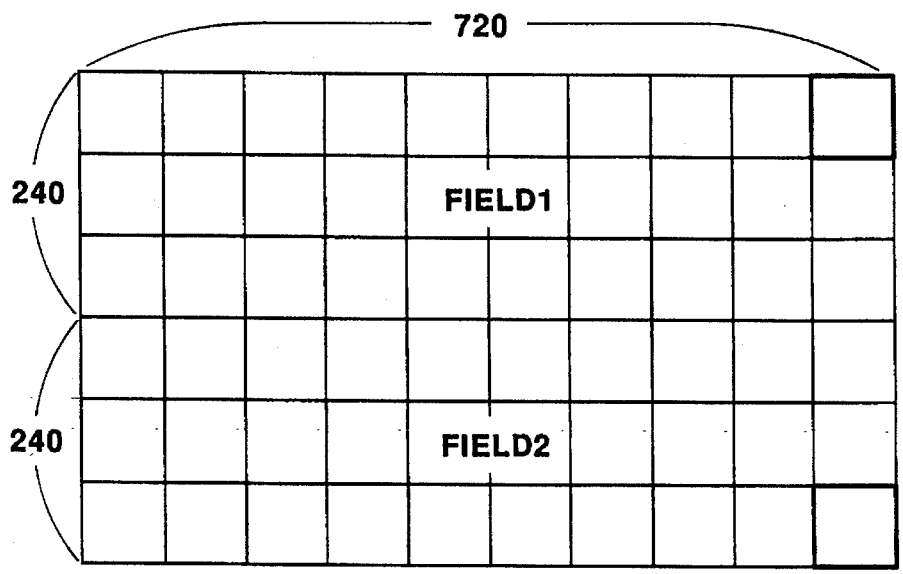
FIG. 14 shows a typical concrete construction of a buffer memory for the picture data encoding device shown in FIG. 13.

That is, the buffer memories 7, 8, 37, 38 are constituted by memories each having a storage capacity of 480×720 pixels, as shown in FIGS. 13 and 14. If the encoding system is designed on the frame-by-frame basis, picture data are stored on the frame-by-frame basis and, if the encoding system is designed on the field-by-field basis, picture data are stored on the field-by-field basis, as shown in FIGS. 13 and 14. Meanwhile, in FIG. 14, two fields need not be temporally contiguous to each other. Although the buffer memory is equal in capacity to a frame, there is no limitation to the memory capacity, and may be larger in capacity than the frame. Thus the buffer memory may be designed to store plural frames. In addition, although two buffer memories are employed in the block diagrams of FIGS. 23 and 27 for achieving matching to the encoding/decoding operations, there is no necessity of employing two buffer memories which may be combined into a sole buffer memory. (2) Motion Prediction/Compensation With the field-by-field encoding/decoding operations, motion prediction from a first field to a second field of one and the same frame, such as prediction from picture I2 to picture B3 as shown in FIG. 8 or prediction from picture P6 to picture P7 shown in FIG. 9, may be employed in effecting motion prediction/compensation.

However, with frame-based encoding/decoding, since two fields are encoded/decoded collectively, as shown in FIG. 7, motion prediction from a first field to a second field belonging to the same frame as the first field is not employed.

As discussed in the foregoing, since the motion prediction of the field-by-field encoding/decoding operation makes use of the motion prediction from the first field to the second field of one and the same frame, the minimum distance between the pictures to be motion-predicted is diminished such that motion prediction comprises motion prediction of the frame-by-frame encoding/decoding operations. Although the motion prediction of the frame-based macroblock is shown in the above-described concrete embodiment, the same motion prediction is used for two fields within the macro-block so that two motion predictive operations of the field-based macro-blocks may be used in substitution. Besides, the frame-by-frame motion prediction is not the motion prediction indispensable to the frame-by-frame encoding/decoding operations, and only the field-by-field motion prediction suffices.

In this manner, with the encoding/decoding method for pictures produced by interlaced scanning, according to the present invention, the encoding/decoding operations by both the field-by-field encoding/decoding method and the frame-by-frame encoding method are possible by associating the block constitutions and the method for controlling the motion prediction with the two encoding/decoding operations.

In such case, it is necessary to transmit to the picture data decoding device data indicating which of the field-by-field encoding operation and the frame-by-frame encoding operations has been carried out, and in which range the encoding operation has been carried out.

To this end, according to the present invention, a flag indicating whether a range of an encoded picture has been processed on the field-by-field basis or on the frame-by-frame basis is provided at a portion of an encoded bit stream, that is encoded picture data. Meanwhile, this range means, for example, a sequence, GOP or a picture. Concretely, with the picture data encoding device, discrimination data for discriminating whether a range of a picture has been encoded on the field-by-field basis or on the frame-by-frame basis is set or superposed at a predetermined position of the encoded bit stream. The picture data decoding device deciphers such predetermined position of the encoded bit stream by the inverse variable length encoding circuit 31 as described above for determining the type of the unit of the decoding operation to perform a decoding operation accordingly for picture reproduction.

It should be noted that the motion prediction in the field-based and frame-based encoding/decoding operations is not limited to the concrete embodiment shown in FIGS. 8 to 10. For example, in the frame-based encoding/decoding operations employing the motion prediction shown in FIGS. 15A, 15B, 16A and 16B, switching may be made for each hierarchical layer of the picture and the frame-based encoding/decoding operations.

Specifically, FIG. 15A shows a concrete example different from the P-picture predicting method for field-by-field encoding/decoding operations, shown in FIG. 8, in the constructional pattern of the I/P/B picture in the GOP layer shown in FIG. 5. FIG. 15B shows a concrete example different from the B-picture predictive method of the field-by-field encoding/decoding operations. That is, a picture P5 is used in the concrete example of FIG. 8 as a prediction picture for picture P8, while a picture such as a picture I2 may also be employed as shown in FIG. 15A. On the other hand, while three pictures, namely the picture I2, picture P5 and an interpolated picture of these two pictures, are used in the concrete example of FIG. 8 as a prediction picture for picture B4, pictures I2, P5, P8, P11 and interpolated pictures of these pictures, may also be employed, as shown in FIG. 15B.

Figure 16A:
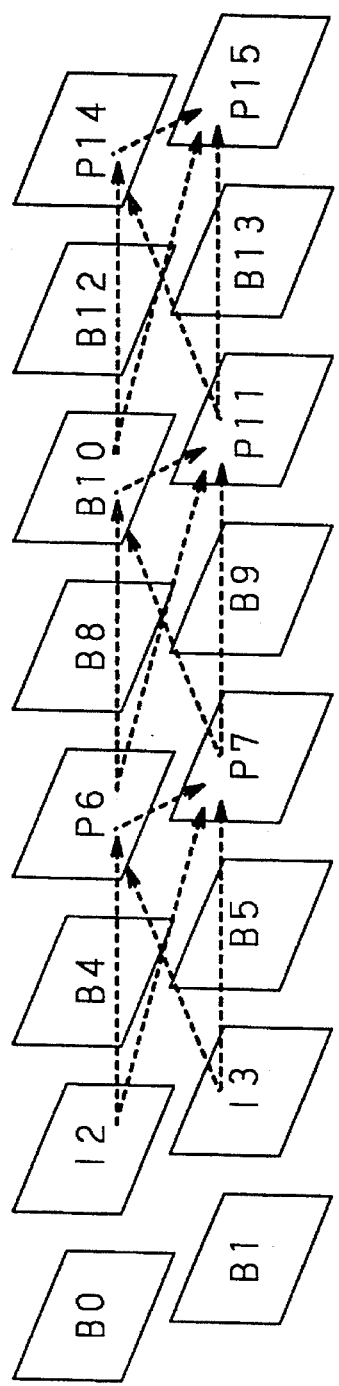
FIGS. 16A and 16B shows a method showing another concrete motion prediction for the field-by-field encoding/decoding shown in FIG. 6.
Figure 16B:
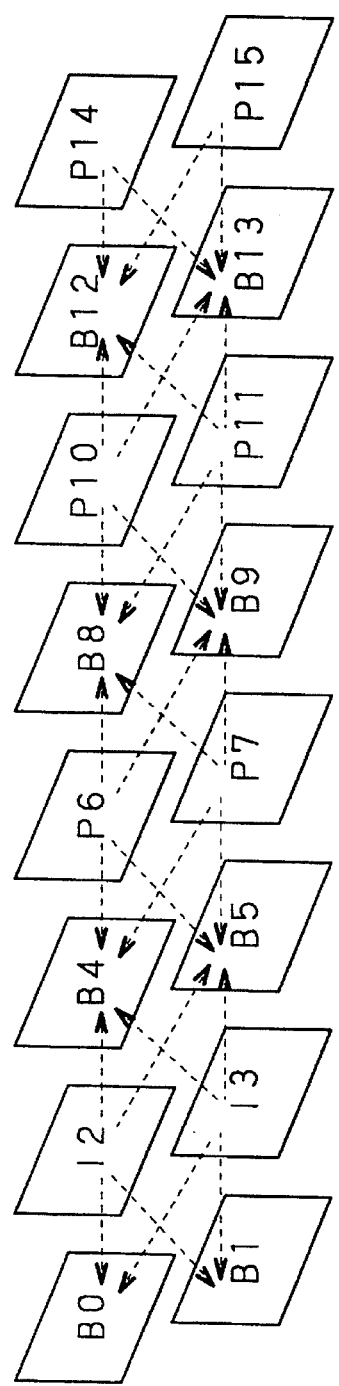

FIG. 16A shows a concrete example different from the predictive method for the B-picture in the field-based encoding/decoding operations shown in FIG. 9, while FIG. 16B shows a concrete example different from the predictive method for the B-picture in the field-based encoding/decoding operations shown in FIG. 9. That is, while picture I3 is employed in the concrete example shown in FIG. 9, picture I2, for example, may also be employed, as shown in FIG. 16A. Besides, while three pictures, namely pictures I3 and P6 and an interpolated picture of these two pictures, are employed in the concrete example of FIG. 9 as a prediction picture for picture B4, pictures I2, I3, P6, P7 and interpolated pictures of these pictures, may also be employed, as shown in FIG. 16B.

In addition, the field-based encoding/decoding operations may also be combined with the frame-based encoding/decoding operations.

Figure 17:
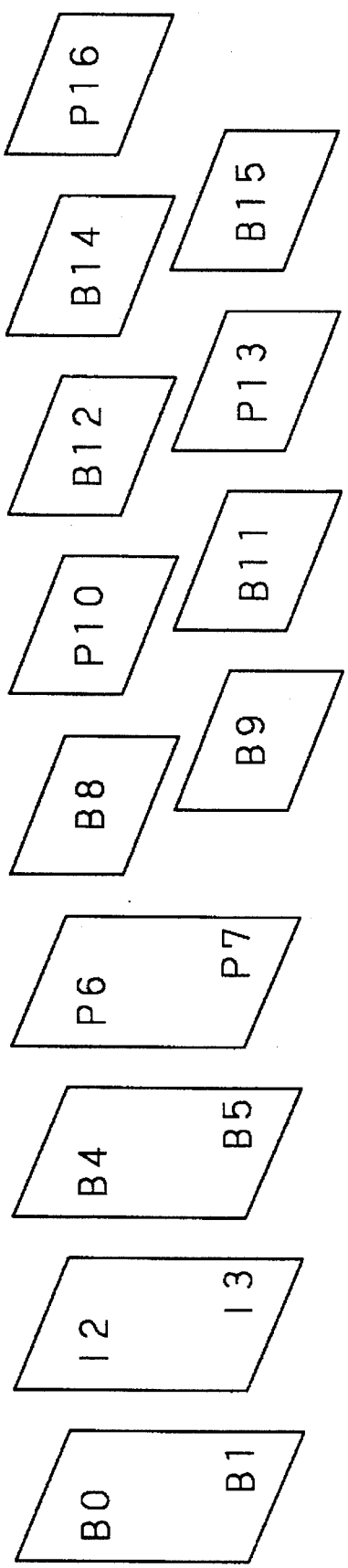
FIG. 17 shows an example of concrete combination of frame-by-frame encoding/decoding and field-by-field encoding/decoding.
Figure 20:
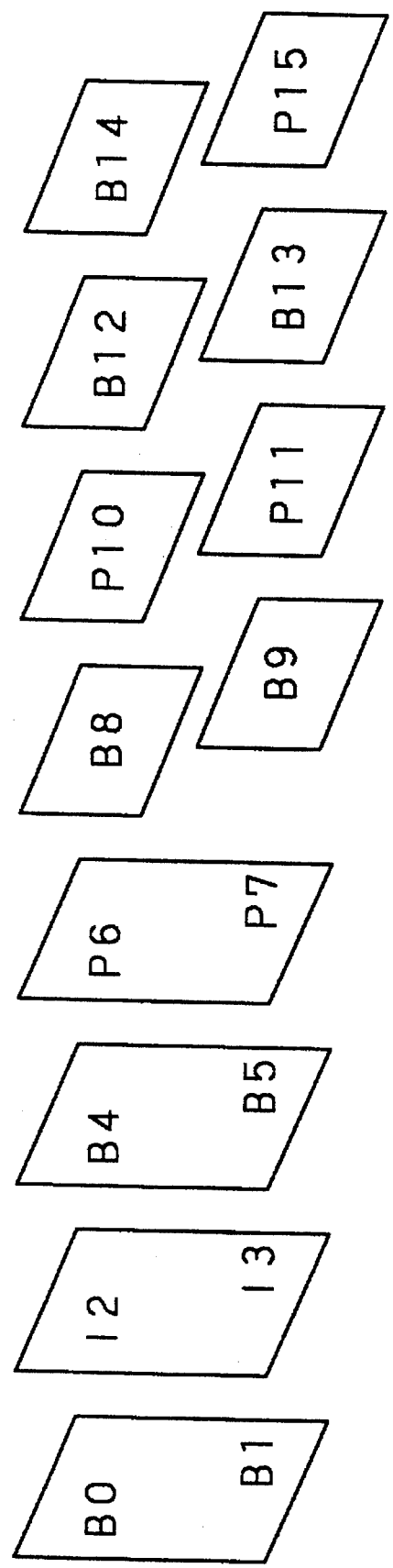
FIG. 20 shows another example of concrete combination of frame-by-frame encoding/decoding and field-by-field encoding/decoding.

FIGS. 17 and 20 illustrate concrete examples in which a plurality of pictures are encoded/decoded on the frame-by-frame basis and next following pictures are subsequently encoded/decoded on the field-by-field basis. FIG. 17 illustrates a combination of the frame-based encoding/decoding operations shown in FIG. 7 and the field-based encoding/decoding operations shown in FIG. 5 and FIG. 20 illustrates a combination of the frame-based encoding/decoding operations shown in FIG. 7 and the field-based encoding/decoding operations shown in FIG. 6.

Figure 18:
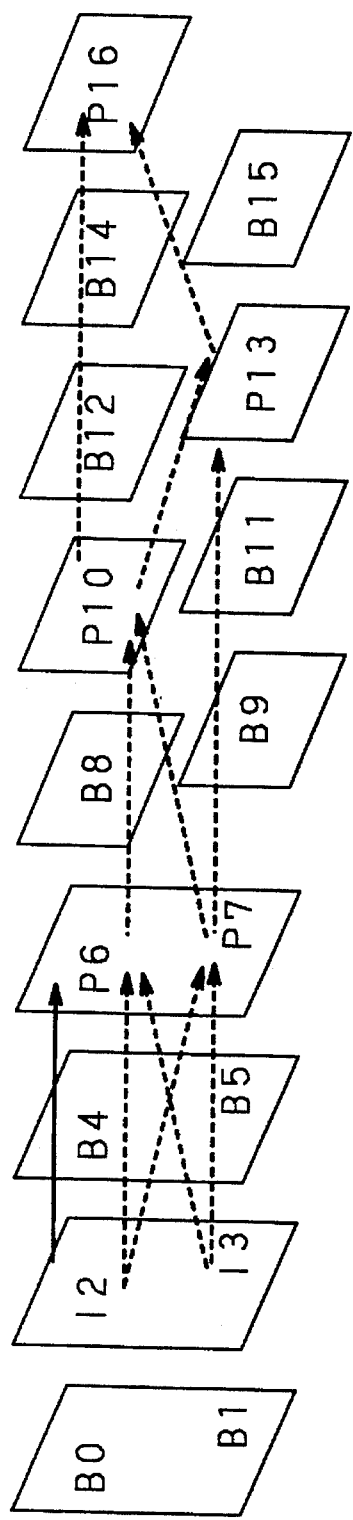
FIG. 18 shows a method for concrete motion prediction of a P-picture in the encoding/decoding shown in FIG. 17.
Figure 19:
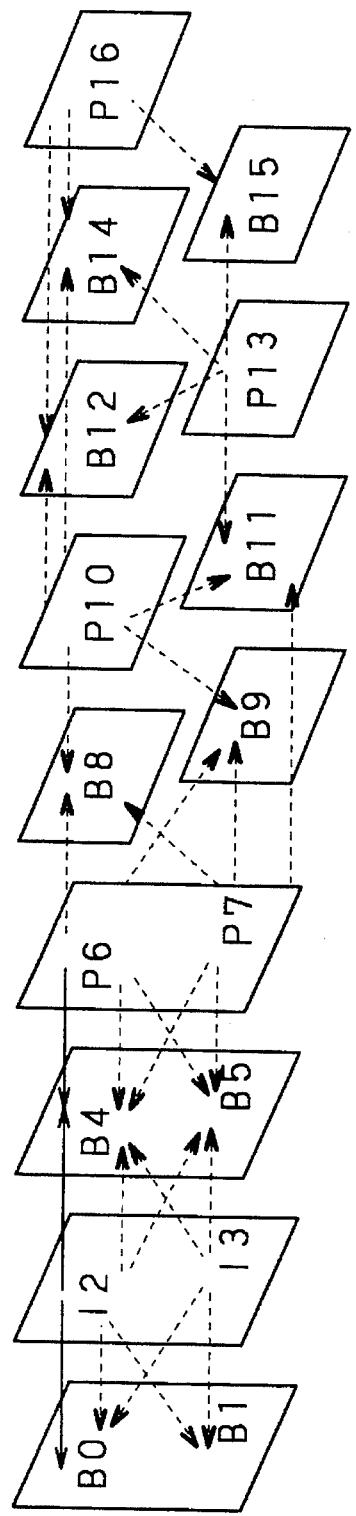
FIG. 19 shows a method for concrete motion prediction of a B-picture in the encoding/decoding shown in FIG. 17.

In FIG. 17, a frame made up of pictures P6 and P7 may employ a frame made up of pictures I2 and I3 as a prediction picture, as shown in FIG. 18, while picture P10 may employ picture P6, for example, as a predictive picture. On the other hand, a frame made up of pictures B4 and B5 may employ a frame made up of pictures I2 and I3, a frame made up of pictures P6 and P7 and interpolated pictures of these frames, as shown in FIG. 19, while picture P8 may employ pictures P6, P7, P10 and interpolated pictures of these pictures.

Figure 21:
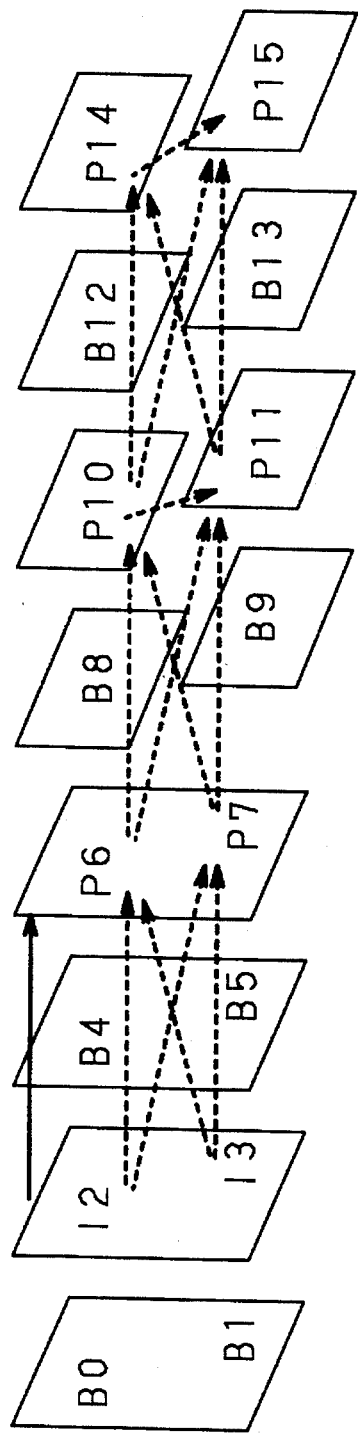
FIG. 21 shows a method for concrete motion prediction of a P-picture in the encoding/decoding shown in FIG. 20.
Figure 22:
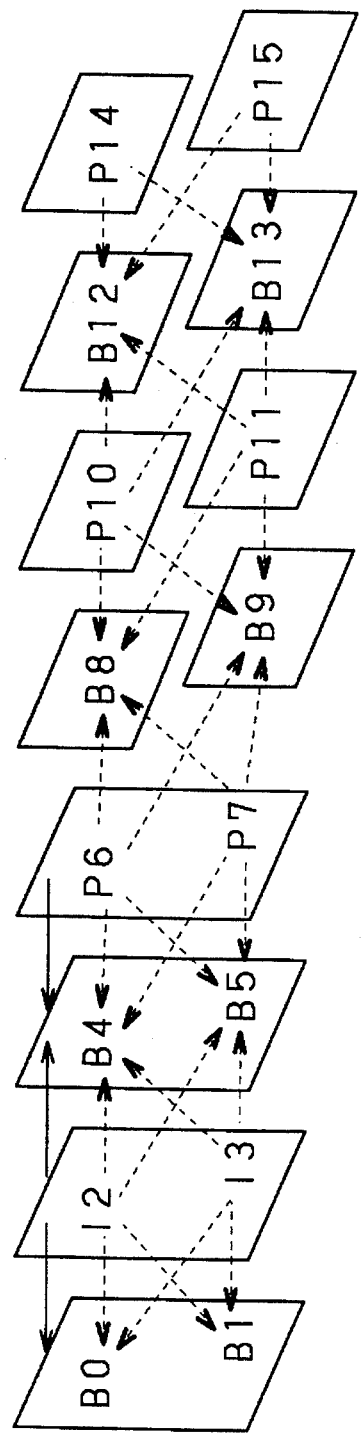
FIG. 22 shows a method for concrete motion prediction of a B-picture in the encoding/decoding shown in FIG. 20.

Next, in FIG. 20, a frame made up of pictures P6 and P7 may employ a frame made up of pictures I2 and I3, as a prediction picture, while a picture P10, for example, may employ picture P6, for example, as a prediction picture, as shown in FIG. 21. On the other hand, a frame made up of pictures B4 and B5 may employ a frame made up of pictures I2 and I3, a frame made up of pictures P6 and P7 and interpolated pictures of these frames, as prediction picture, as shown in FIG. 22, while picture B8, for example, may employ pictures P6, P7, P10, P11 and interpolated pictures of these pictures, as prediction picture, as also shown in FIG. 22.

In this manner, as shown in FIGS. 17 to 22, frame-based encoding/decoding operations may be combined with field-based encoding/decoding operations without any inconveniences. In other words, it is possible with the picture data encoding method and picture data decoding method according to the present invention to achieve efficient encoding for pictures with only small motion, pictures replete with motion and mixed pictures of these pictures, by switching from frame-based encoding/decoding operations to field-based encoding/decoding operations and vice versa when the pictures are produced as a result of interlaced scanning.

2. Picture Data Encoding Device

Figure 23:
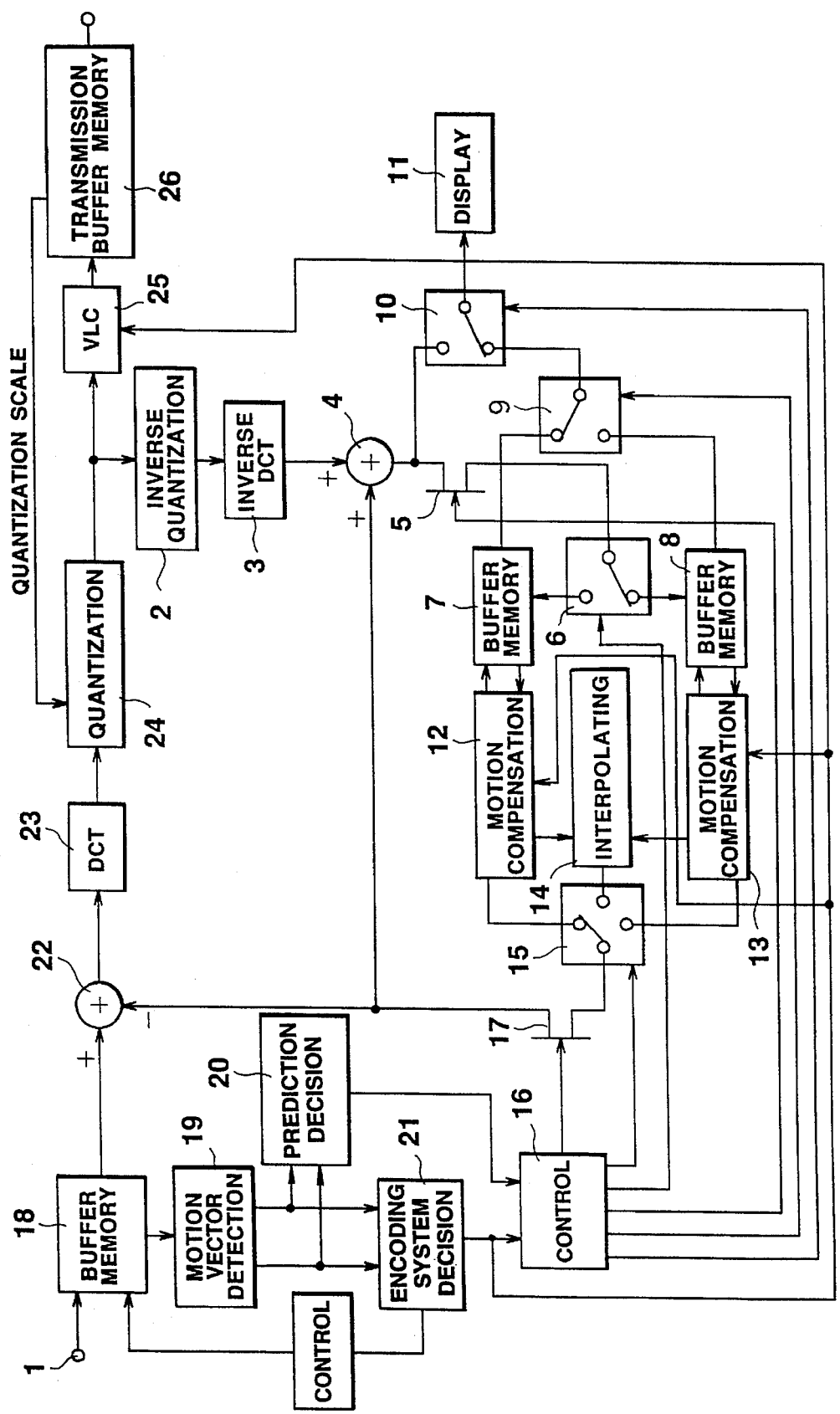
FIG. 23 is a block diagram showing a concrete circuit construction for a picture data encoding device according to the present invention.

FIG. 23 is a block diagram showing a concrete circuit construction of a picture data encoding device according to the present invention.

As shown in FIG. 23, the picture data encoding device (encoder) comprises a local decoding circuit made up of an inverse quantization circuit 2 to gate 17, having the same circuit arrangement as that of a picture data decoding device as later explained.

Figure 24:
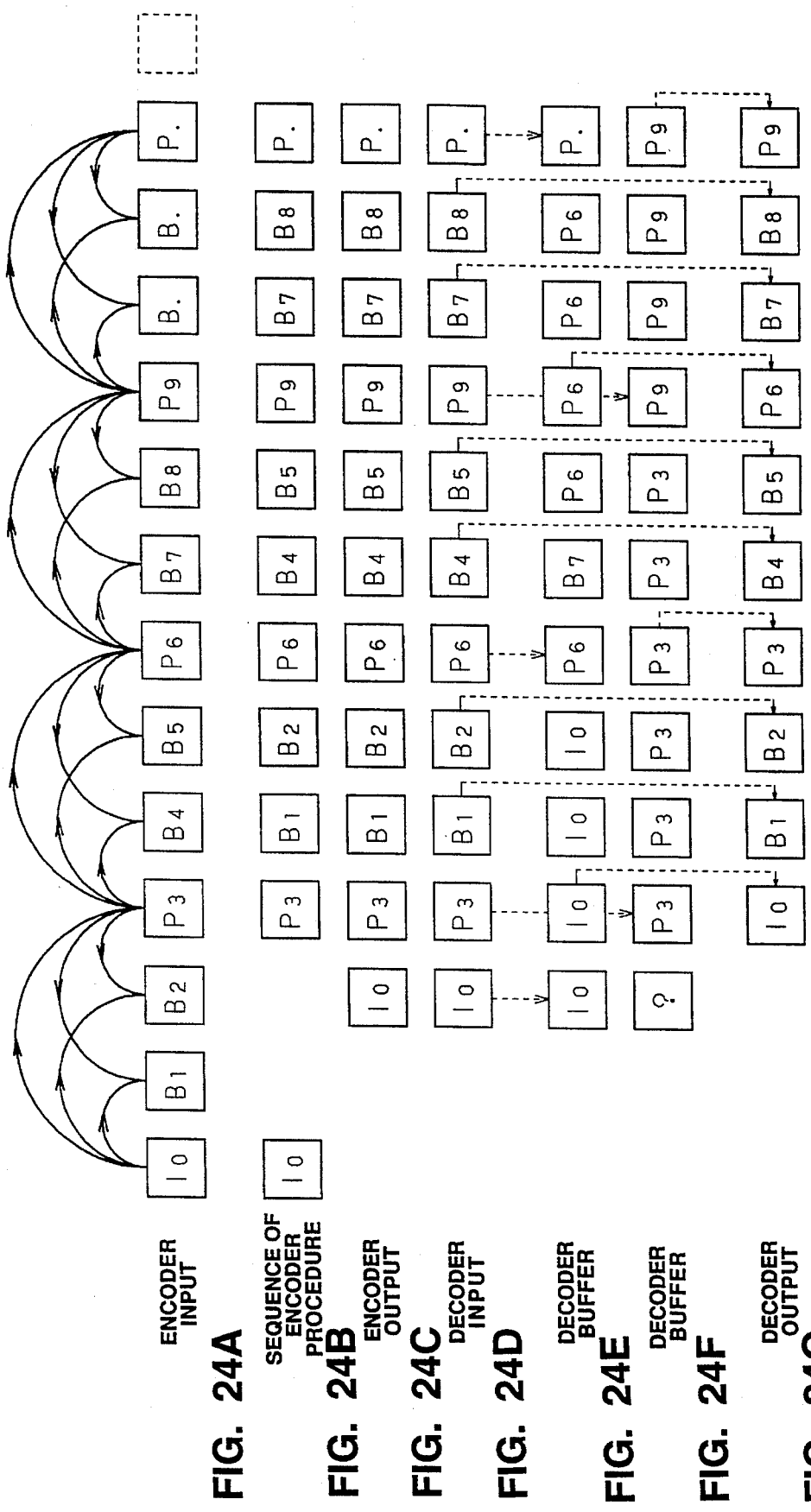
FIG. 24A, 24B, 24C, 24D, 24E, 24F and 24G show the relation of pictures entered to the picture data encoding device shown in FIG. 23.

When picture data of a picture (field or frame) is entered at terminal 1, these picture data are stored once in buffer memory 18. Specifically, picture data are entered in the sequence of I0, B1, B2, P3, . . . as shown in FIG. 24A, and re-arrayed in the sequence in which the picture data are encoded by the encoder, as shown in FIG. 24B. Motion prediction as shown in FIG. 1 is carried out between the thus re-arrayed pictures. The input pictures I0, B1, B2, P3, . . . are shown as fields in FIGS. 5 and 6, while they are shown as frames in FIG. 7.

The pictures thus re-arrayed are employed for detecting a motion vector by a motion vector detection circuit 19. Based on the previously encoded picture(s), the motion vector detection circuit 19 detects the motion vector required for generating the picture(s) for prediction. That is, a forward picture and a backward picture are held by the buffer memory 18 and a motion vector is detected between these pictures and a current reference picture. For detecting the motion vector, such a motion vector is employed which has a minimum sum of absolute values of the differences between pictures on the macro-block basis.

The motion vector and the sums of the absolute values of the differences between pictures on the macro-block basis are transmitted to an encoding system decision circuit 21. By employing an algorithm, which will be explained later, the encoding system decision circuit 21 decides whether the encoding system of a picture of a certain hierarchical layer is a field-based encoding system or a frame-based encoding system. The information concerning the encoding system, that is whether the encoding system is a field-based system or a frame-based system, and the motion vector, are transmitted to motion compensation circuits 12 and 13 and to variable length encoding circuit 25 so as to be used for controlling the buffer memories 7 and 8, while being transmitted to the picture data decoding device as later explained. The information concerning the encoding system is transmitted to a controlling circuit 16 which outputs control signals controlling the encoding system to gates 5, 17 and changeover switches 6, 9, 10 and 15.

In addition, the motion vector and the sums of the absolute values of the differences between pictures on the macro-block basis are transmitted to an intra-picture/predictive/backward/bidirectional prediction decision circuit 20, referred to herein as a prediction decision circuit. Based on these values, the prediction decision circuit 20 decides the predictive mode for the reference macro-block.

The predictive mode is transmitted to the control circuit 16. Based on the predictive mode, the control circuit 16 outputs a control signal to the gates 5 and 17 for effecting switching between intra-picture/predictive/backward/bidirectional prediction. The control circuit 16 transmits the motion vector associated with the selected prediction mode to buffer memories 7 and 8 for generating the prediction picture. More concretely, if the mode is the intra-picture encoding mode, the input picture itself is generated, whereas, if the mode is the predictive/backward/bidirectional predictive mode, respective prediction pictures are generated. The operation of the gates 5 and 17 and changeover switches 6, 9, 10 and 15 is the same as that of the changeover switches 36, 39, 40 and 45 (of FIG. 27), so that the corresponding operation is omitted for simplicity.

The predictive pictures from buffer memories 7 and 8 are transmitted to a difference unit 22 generating difference data between the predictive picture and the current picture. The difference data are supplied to a discrete cosine transform (DCT) circuit 23.

The DCT circuit 23 discrete cosine transforms the input picture data or difference data for each block by taking advantage of the two-dimensional correlation of the picture signals to transmit the resulting DCT data to quantization circuit 24.

The quantization circuit 24 quantizes the DCT data with quantization step size (scale) determined for each macro-block or for each slice to process the results by so-called zigzag scanning. The quantization circuit then transmits the resulting quantized data to a variable length coding circuit 25 and to a dequantization circuit 2.

The quantization step size, employed for quantization, is selected to a value of not causing the failure (overflow) of the transmission buffer memory 26 by feeding back the residual contents of the transmission buffer memory 26. The quantization step size data as well as the quantization data s supplied to VLC circuit 25 and to dequantization circuit 2.

The VLC circuit 25 proceeds to process the information including the quantization data, quantization step size, predictive mode, motion vector or the encoding system by variable length encoding, appends the coding system information, that is the information concerning whether the encoding system is the field-by-field encoding system of the frame-by-frame encoding system, to a header of the predetermined hierarchical layer, and transmits the resulting data, a sth transmission data, to transmission buffer memory 26.

The transmission buffer memory 26 stores the transmission data temporarily in a memory and subsequently transmits the stored data as a bit stream at a predetermined timing. Besides, the transmission buffer memory 26 feeds back the macro-block based quantization control signals to the quantization circuit 24 depending on the quantity of residual data in the memory to control the quantization step size. In this manner, the transmission buffer memory 26 controls the data volume generated as the bit stream to maintain a moderate amount of data, that is the data volume which will not produce an underflow or an overflow, in the memory.

For example, if the residual data volume in buffer memory 26 is increased to an allowable upper limit, the transmission buffer memory increases the quantization step size of the quantization circuit 24 by quantization control signals for lowering the data volume of the quantized data.

Conversely, if the residual data volume in buffer memory 26 is decreased up to an allowable lower limit value, the data volume of the quantization data is increased by decreasing the quantization step size of the quantization circuit 24 by the quantization control signals.

It will be seen from above that the bit stream from the transmission buffer memory 26, adjusted in its data volume, is multiplexed with encoded audio signals and synchronization signals. The multiplexed signals are added to with error correction code data and modulated in a predetermined manner before being recorded as pits of projections and recesses on a master disc by means of a laser beam. A stamper is produced from the master disc and a large number of duplicated discs, for example, picture recording media, such as optical discs, from the stamper. Besides, the bit stream is transmitted over a transmission channel to a picture data decoding unit as later explained. Meanwhile, the picture recording medium is not limited to the optical disc, but may for example be a magnetic tape.

On the other hand, output data from the inverse DCT circuit 3 is added to with the predictive picture by addition circuit 4 to effect local decoding. The operation of the local decoding is the same as that of a picture decoding device as later explained and hence the corresponding explanation is not made for simplicity.

Figure 3:
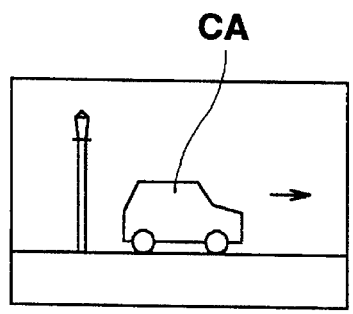
FIG. 3 shows a concrete example of a picture having a moving object.
Figure 4:
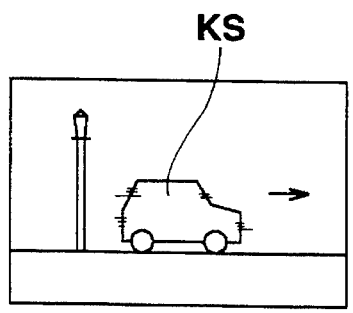
FIG. 4 shows a picture blurred in the shape of a comb.

It is noted that the picture constructing pattern is not limited to that shown in FIG. 3 and differs with different encoding sequences. Concretely, there are a number of variations in the encoding processing sequence of P-pictures and B-pictures temporally sandwiched between the P-pictures. However, these may be dealt with by simply changing the processing sequence by changing the control for buffer memories 7 and 8.

Figure 25:
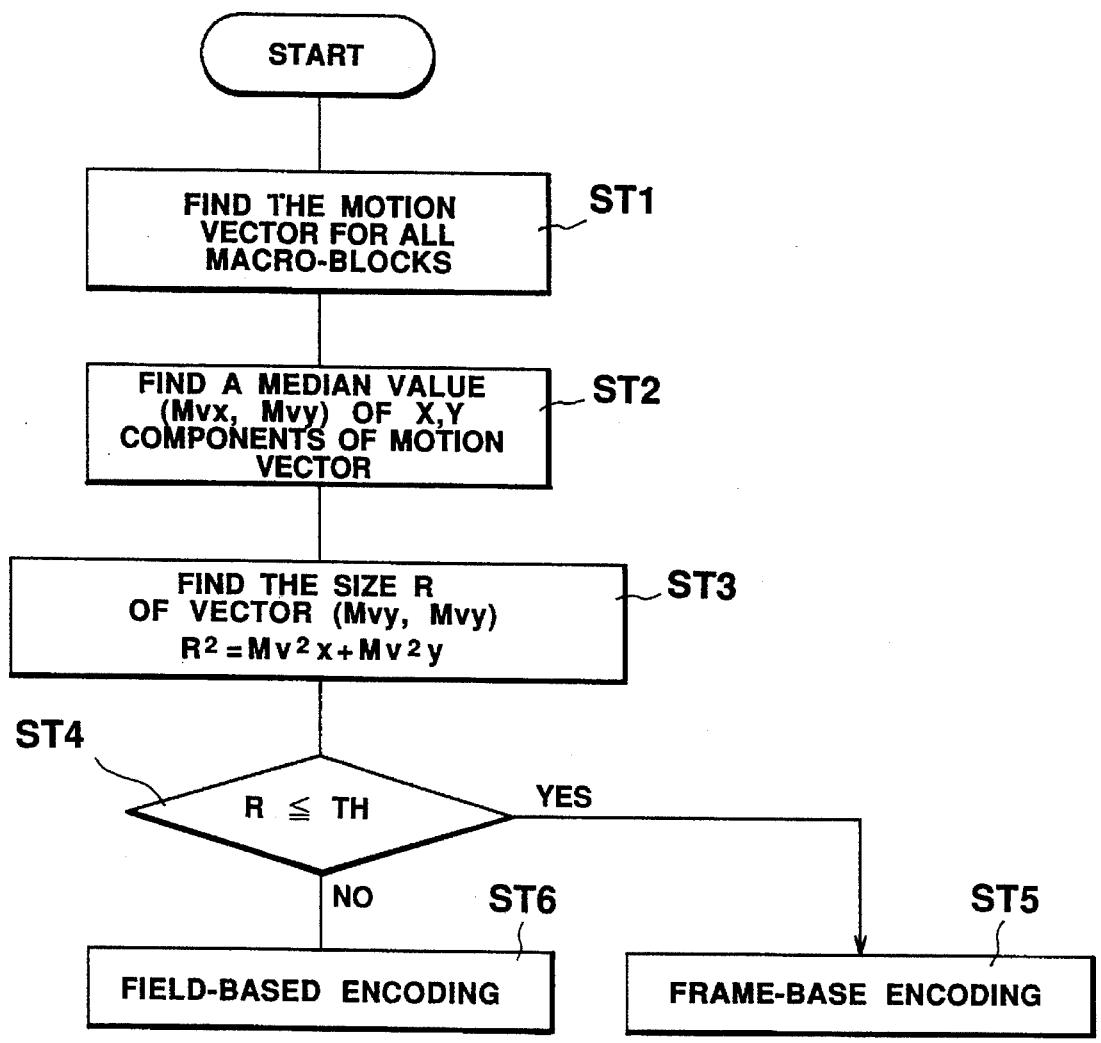
FIG. 25 is a flow chart illustrating an algorithm of an encoding system decision circuit constituting the picture data encoding device shown in FIG. 23.

The concrete algorithm for a encoding system decision circuit 21 is hereinafter explained by referring to a flow chart shown in FIG. 25.

The encoding system decision circuit 21 selects the encoding system by taking advantage of the motion vector from the first frame, e.g. an odd field, to the second field, such as an even field.

Concretely, encoding system decision circuit 21 finds the motion vector at step ST1 for all of the macro-blocks in a frame to be encoded before proceeding to step ST2.

At step ST2, encoding system decision circuit 21 finds a median value of each of the horizontal components (x) and vertical components (y) of the motion vector, before proceeding to step ST3. Concretely, the median value of the horizontal components is found in the following manner. First, the horizontal components of the motion vector are arrayed in the order of the falling powers, and the value of the center data is adopted as a median $Mv_x$ of the horizontal components. The median value $Mv_y$ is found in the similar manner.

At step ST3 encoding system decision circuit 21 finds the size R of the vector MV found at step ST2 as a parameter indicating the magnitude of the motion of the entire screen, because the vector MV is the parameter indicating the magnitude of the entire screen. The decision circuit then proceeds to step ST4. The size R is found by the following formula 1

$$R = |MV\sigma| = \sqrt{Mv_x^2 + Mv_y^2} \quad (1)$$

At step ST4, encoding system decision circuit 21 causes the encoding system to be switched by the size R as found at step ST3. Since the field-by-field encoding system (encoding operation) is more favorable with pictures with fast motion, and the frame-by-frame encoding system (encoding operation) is more favorable with pictures with little motion, the encoding system decision circuit 21 proceeds to step ST5 if the size R is not more than a predetermined threshold value TH to select the frame-based encoding system. Otherwise, the decision circuit proceeds to step ST6 to select the field-based encoding system.

It will be seen from above that the picture data encoding device according to the present invention decides whether the encoding system is to be performed on the field-by-field basis or on the frame-by-frame basis, depending on the motion occurring in the picture, more specifically, on the motion vector between the first and second fields of the same frame or on the size of the median value of the motion vector, so that efficient encoding may be achieved not only with the picture having abundant motion or little motion but also with the picture having both abundant motion and little motion.

3. Picture Data Format

Concrete examples of the bit stream outputted from the present picture data encoding device, that is of the picture data format, are hereinafter explained.

Figure 26A:
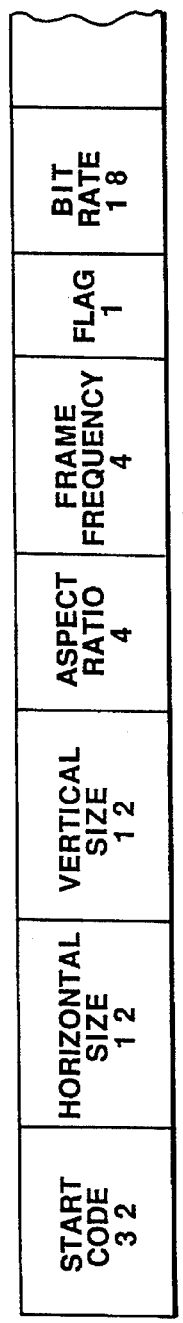
FIGS. 26A, 26B and 26C show a concrete format of a header of encoded picture data.

FIG. 26A shows an example in which discrimination data for discriminating whether the encoding has been performed on the frame-by-frame basis or on the field-by-field basis (the information concerning the encoding system) is appended as flag, as shown in FIG. 26A. In the video sequence layer, start code, horizontal size, vertical size etc. are recorded with a predetermined number of bits, indicated by numerals in the figures, as shown in FIG. 26A. In the present embodiment, the discrimination data for discriminating whether the encoding has been performed on the field-by-field basis or on the frame-by-frame basis, is appended after the frame frequency as a 1-bit flag. The flag may also be appended at some other location.

Figure 26B:
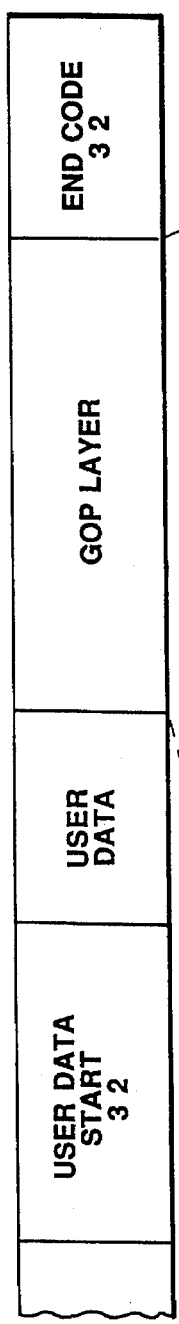

The above flag may also be added to a header of the GOP layer, as shown in FIG. 26B. In the present instance, discrimination data are added following the time code as a 1-bit flag. The flag may also be added at any other location.

Figure 26C:
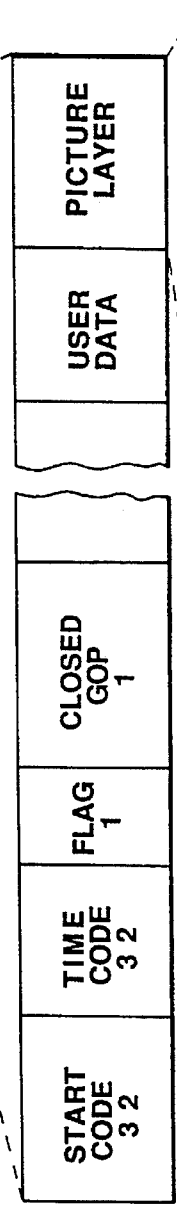

FIG. 26C shows an instance in which the flag is added to the MPEG standard. Such flag may also be written in extension regions of each layer as prescribed by MPEG. For the video sequence layer, for example, it may be written in the extension region (sequence extension bytes) or in user data. Concretely, the flag may be added to the extension region of the picture layer according to the MPEG standard, as shown in FIG. 26C. 2-bit flags are used for indicating the encoding system. The 2-bit flags denote the following contents:

00: A picture encoded on the frame-by-frame basis.

01: A first field of a picture encoded on the field-by-field basis.

10: A second field of a picture encoded on the field-by-field basis.

11: Spare.

4. Picture Data Decoding Device

Figure 27:
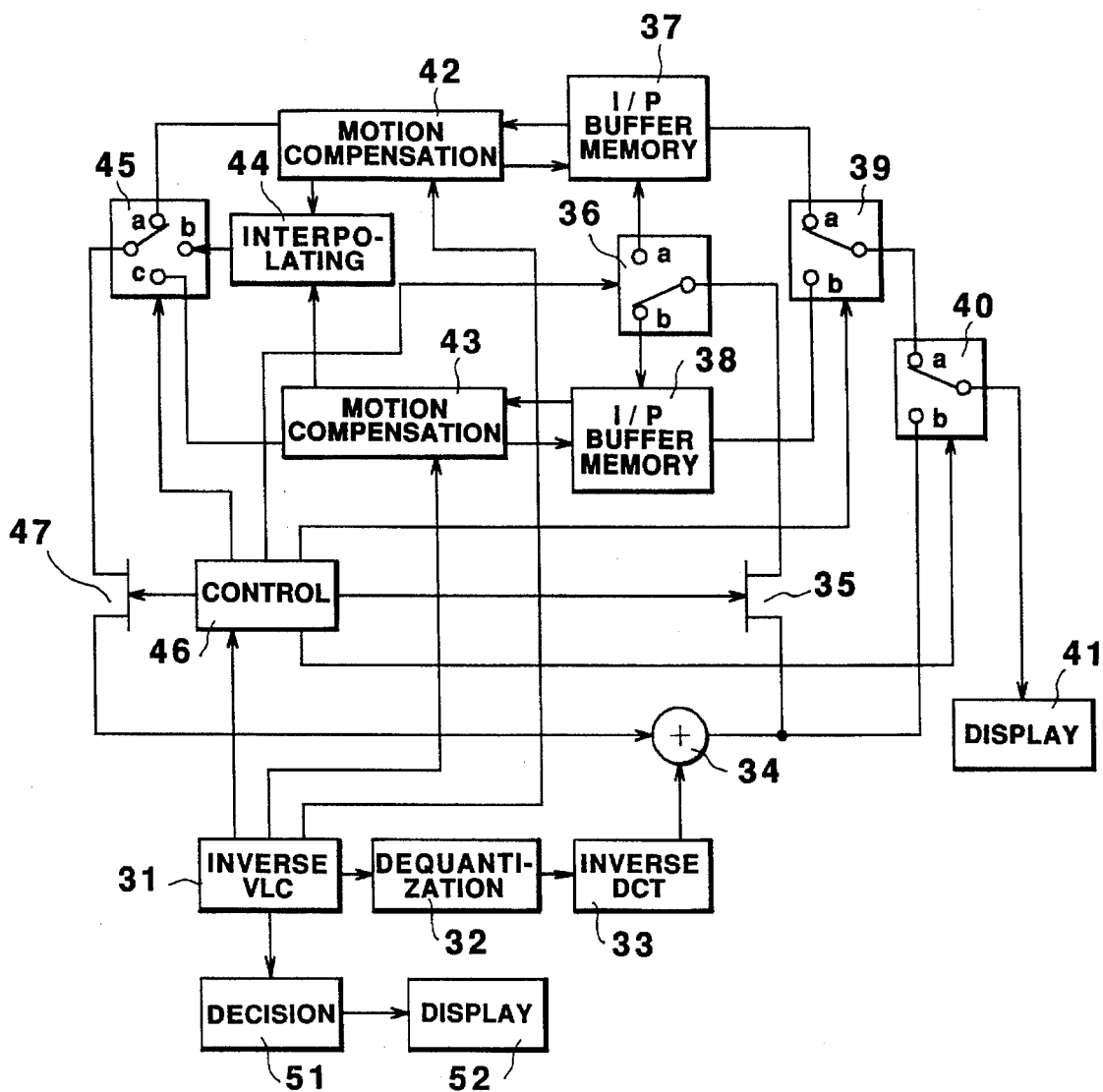
FIG. 27 is a block diagram showing a concrete circuit construction for a picture data decoding device according to the present invention.

FIG. 27 is a block diagram showing a concrete circuit arrangement of a picture data decoder according to the present invention.

An inverse variable length coding circuit (inverse VLC circuit) 31 encodes the bit stream from the picture data encoder shown in FIG. 23 or the bit stream obtained on reproducing a picture recording medium, such as an optical disc, by inverse variable length encoding, and outputs the resulting data to a dequantization circuit 32. Simultaneously, the inverse VLC circuit 31 deciphers data written by superposition on the picture data during encoding, such as motion vector, quantization width (quantization step size) of encoding information.

Above all, inverse VLC circuit 31 deciphers the flags appended to headers of the video sequence layer, COP layer or the picture layer to obtain the information as to whether the decoding is to be made on the frame-by-frame basis or on the field-by-field basis. Such information is supplied to a control circuit 46 which then generates control signals for frame-based processing or field-based processing. Specifically, the control circuit 46 is responsive to the output of inverse VLC circuit 31 to generate a variety of control signals for changing over gates 35 and 47 and fixed contacts of changeover switches 36, 39, 40 and 45.

That is, if, in the case of frame-based processing, each picture is made up of 480 lines each consisting of 720 pixels, and each macro-block consists of 16×16 pixels, picture processing is completed by 1350 macro-blocks, and a corresponding control signal is generated for processing the next picture. On the other hand, in the case of field-based processing, picture processing is completed by 675 macro-blocks and a corresponding control signal is generated for processing the next picture. Besides, frame-based or field-based decoding is carried out by controlling the scheduling of buffer memories 37 and 38.

On the other hand, the control signal indicating if the decoding is to be frame-based or field-based, produced by the inverse VLC circuit 31, is also supplied to motion compensation circuits 42 and 43, and a frame-based or field-based decoding is carried out by the motion compensation circuits 42 and 43 controlling addresses of the buffer memories 37 and 38, as discussed in detail hereinbelow.

The dequantization circuit 32 inversely scans and dequantizes data processed by inverse VLC to output the resulting data to an inverse DCT circuit 33. The inverse DCT circuit 33 inversely discrete cosine transforms input data to output the resulting data to an additive node 34. The additive node 34 is supplied via gate 47 with predictive picture data as selected by switching of the changeover switch 45. The predictive picture data is summed to output data of the inverse DCT circuit 33 to generate decoded picture data.

If an output of the additive node 34 is an I-picture or a P-picture, gate 35 is opened, and decoded picture data are supplied via changeover switch 36 to buffer memories 37 or 38 so as to be stored therein.

Specifically, if the output of the additive node 34 is the I-picture or the P-picture, changeover switches 39 and 40 are changed over to fixed contacts a. The changeover switch 36 is alternately changed over to contacts a and b so that the picture (I-picture or the P-picture) outputted from the additive node 34 is alternately stored in the buffer memories 37 and 38.

If picture data arrayed in the sequence of pictures I0, B1, B2, P3, B4, B5, P6, B7, B8, P9, as shown in FIG. 24A, are processed by picture data encoder in the sequence of pictures I0, P3, B1, B2, P6, B4, B5, P9, B7, B8, as shown in FIG. 24B, the picture data are entered to inverse VLC circuit 31 in the latter sequence of pictures, as shown in FIG. 24D.

As a result, thereof, if decoded data of picture I0 are stored in buffer memory 37, as shown in FIG. 24E, decoded data of picture P3 are stored in buffer memory 38, as shown in FIG. 24F. Besides, data of picture I0 of buffer memory 37 are updated to data of picture P6, while data of picture P3 of buffer memory 38 are updated to data of picture P9, as shown FIG. 24E and 24F.

When data of pictures B1 or B2 are entered to additive node 34 from inverse DCT circuit 33 in the wake of pictures I0 and P3, data of picture I0 stored in buffer memory 37 are motion-compensated in motion compensation circuit 42 in accordance with the motion vector before being supplied to an interpolating circuit 44. On the other hand, data of picture P3 stored in buffer memory 38 are motion-compensated in motion compensation circuit 43 in accordance with the motion vector before being supplied to interpolating circuit 44. The interpolating circuit 44 combines input data from the motion compensation circuits 42, 43 art a predetermined ratio in accordance witch data entered from the inverse VLC circuit 31. The combined data is selected by changeover switch 45 so as to be supplied via its contact b and gate 47 to additive node 34. The additive node 34 sums data from inverse VLC circuit 33 and data as selected by changeover circuit 45 for decoding the pictures B1 or B2.

If the pictures B1 or B2 are decoded only from the previous picture I0, changeover switch 45 is changed over to its contact a, whereas, if the pictures B1 or B2 are decoded only from the posterior picture P3, changeover switch 45 is changed over to its contact c. In either case, data of the pictures I0 or P3 are supplied to additive node 34.

The changeover switch 39 is adapted for being switched in a reverse phase to changeover switch 36. That is, if changeover switch 36 is changed over to its contact a or b, changeover switch 39 is changed over to its contact b or a, respectively. The result is that, if, after picture I0 is stored in buffer memory 37, changeover switch 36 is changed over to its contact b and picture P3 is stored in buffer memory 38, changeover switch 39 is changed over to its contact a, the changeover switch 40 being then changed over to its contact a, and the picture I0 is read out from buffer memory 37, as shown at g in FIG. 24, so as to be supplied via changeover switches 39, 40 to a display 41, where the reproduced picture is displayed. When pictures B1 and B2 are outputted from additive node 34, changeover switch 40 is already changed over to its contact b, so that pictures B1 and B2 are supplied to display 41, as shown at G in FIG. 24. The changeover switch 39 is then changed over to its contact b, while the changeover switch 39 is changed over to its contact a, so that the picture P3 already stored in buffer memory 38 is read out and supplied to display 41.

A concrete circuit arrangement of the inverse VLC circuit 31 is hereinafter explained.

Figure 28:
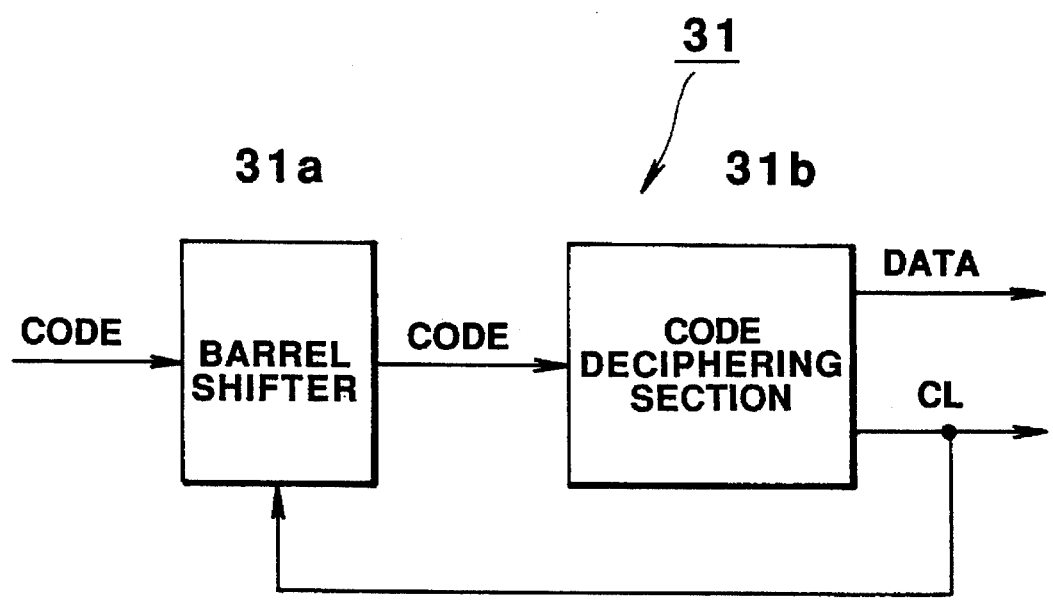
FIG. 28 is a block diagram showing a concrete circuit construction of an inverse VLC circuit constituting the picture data decoding device shown in FIG. 27.

The inverse VLC circuit 31 includes a barrel shifter 31a and a code deciphering section 31b, as shown in FIG. 28. Input code data are supplied by barrel shifter 31a to the code deciphering section 31b on the 16- or 32-bit basis. The code deciphering section 31b is constituted by a code table or matching circuitry, not shown, for matching the input code data to the code data stored in the code table, and outputting the data and its code length CL, based on the code type, in case of coincidence between the two code data.

The data are supplied to other circuitry of the inverse VLC circuit, not shown, before being supplied to the above-mentioned control circuit 46, motion compensation circuit 43, etc.

On the other hand, the code length CL is supplied to barrel shifter 31a as a shift quantity to be shifted next time. Barrel shifter 31a then outputs the next code data on the 16- aid 32-bit basis to the code deciphering section 31b in dependence upon the shift quantity.

Consequently, the flag for indicating the frame-based processing or field-based processing is also written in the codetable as the header along with other code data.

It will be seen from above that, with the picture data decoding device according to the present invention, picture data may be reproduced by detecting the flag provided in the portion of header for the video sequence layer, GOP layer or the picture layer which is adapted for indicating whether the picture data have been processed on the field-by-field basis or on the frame-by-frame basis, and by decoding the picture data in dependence upon the flag.

Meanwhile, the picture data decoding device of the illustrated embodiment is able to execute decoding both the field-based picture data and the frame-based picture data. In case of a device in which only one of these picture data can be decoded, a decision may be given from the flag as to if the device is able to execute decoding of field-based picture data or frame-based picture data.

Specifically, a decision circuit 51 for concluding if decoding is possible based on the flag supplied from inverse VLC circuit 31 and a display unit 52 for displaying the result of decision are provided, as shown in FIG. 27.

Figure 29:
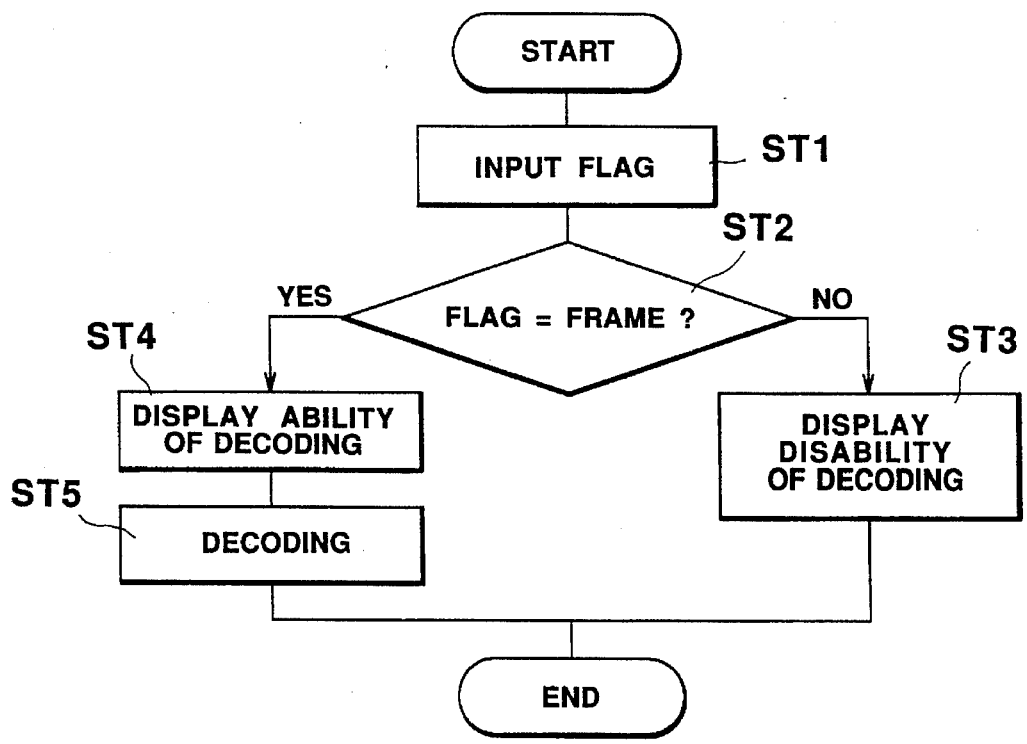
FIG. 29 is a flow chart illustrating the operation of the picture data decoding device according to the present invention.
Figure 30:
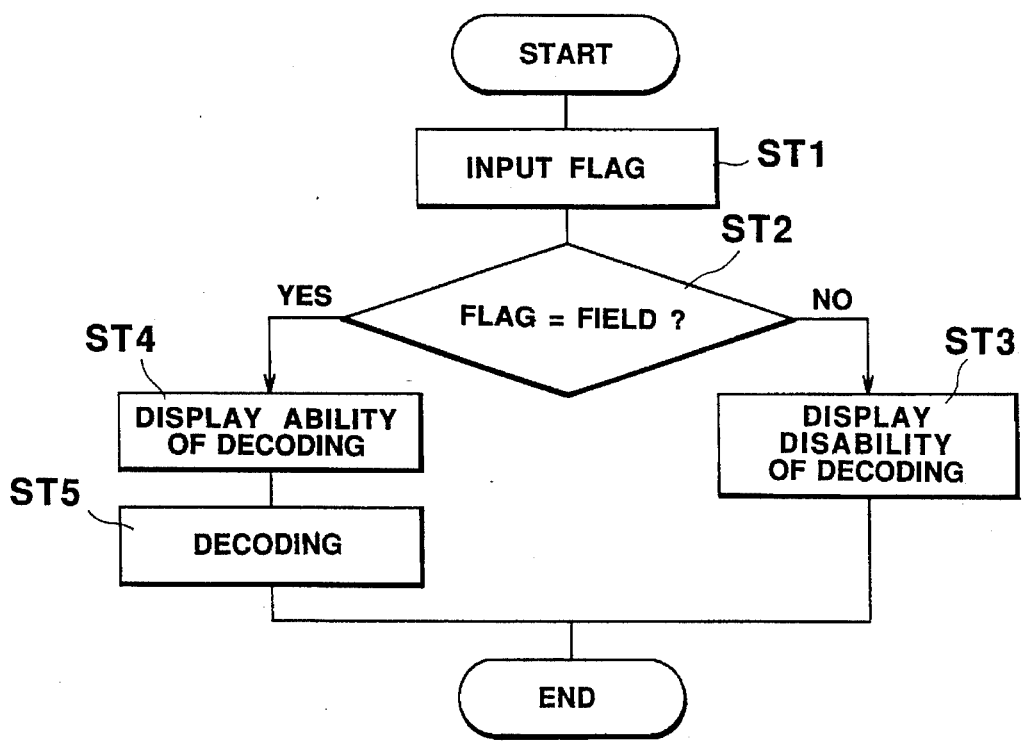
FIG. 30 is a flow chart illustrating the operation of the picture data decoding device according to the present invention.

In the case of a picture data decoding device for decoding only field-based picture data, an operation is executed in accordance with a flowchart shown in FIG. 29, whereas, in the case of a picture data decoding device for decoding only frame-based picture data, an operation is executed in accordance with a flowchart shown in FIG. 29.

That is, with the picture data decoding device for decoding only field-based picture data, decision circuit 51 enters a flag at step ST1, before proceeding to step ST2.

At step ST2, decision circuit 51 checks to see if the flag indicates a frame-based processing. If the result is YES, decision circuit proceeds to step ST4 and, if otherwise, decision circuit 51 proceeds to step ST3.

At step ST3, decision circuit 51 causes the display unit 52 to display that decoding is impossible, before terminating the program.

At step ST4, decision circuit 51 causes the display unit 52 to display that decoding is possible, before terminating the program. Decoding is executed at step ST5.

On the other hand, with the picture data decoding device for decoding only frame-based picture data, decision circuit 51 enters a flag at step ST1, before proceeding to step ST2.

At step ST2, decision circuit 51 checks to see if the flag indicates a field-based processing. If the result is YES, decision circuit proceeds to step ST4 and, if otherwise, decision circuit 51 proceeds to step ST3.

At step ST3, decision circuit 51 causes the display unit 52 to display that decoding is impossible, before terminating the program.

At step ST4, decision circuit 51 causes the display unit 52 to display that decoding is possible, before terminating the program. Decoding is executed at step ST5.

In this manner, the user may easily grasp the reason the picture data cannot be reproduced by the device by checking the display on the display section 52.

Tables 1 and 2 illustrate concrete examples of discrimination data useful in discriminating whether the encoding has been made on the field-by,field basis or on the frame-by-frame basis. The concrete examples shown therein correspond to specifications of picture layers in 25-Nov-92 Teat Model 3, Draft Revision 1, issued as N-paper on Nov. 25, 1992 by ISO/ICE JTC1/SC29/WG11.

TABLE 1

```
picture 0 {
    picture_start_code                                              32   bslbf
    temporal_reference                                              10   uimsbf
    if(sscalable) {
        lower_picture_reference                                     10   uimsbf
    }
    picture_coding_type                                              3   uimsbf
    vbv_delay                                                       16   uimsbf
    if (picture_coding_type==2 || picture_coding_type==3) {
        full_pel_forward_vector                                      1
        forward_f_code                                               3   uimsbf
    }
    while(nextbits0== '1' ) {
        extra_bit_picture                                            1   "1"
        extra_information_picture                                    8
    }
    extra_bit_picture                                                1   "0"
    next_start_code0
    if (nextbits0==extension_start_code) {
        extention_start_code                                        32   bslbf
        if (picture_coding_type==2 || picture_coding_type==3) {
            forward_vertical_f_code                                  3   uimsbf
        }
        if(picture_coding_type==3) {
            backward_vertical_f_code                                 3   uimsbf
        }
        picture_structure                                            2   uimsbf
        forward_reference_fields                                     2   uimsbf
        backward_reference_fields                                    2   uimsbf
        if (chroma_format== "01" ) {   /*4:2:0*/
            chroma_postprocessing_type                               1   uimsbf
        } else {
            reserved                                                 1   uimsbf
        }
        if (video_format!= '000' ) {/*composite input*/
            v-axis                                                   1   uimsbf
            filed_sequence                                           3   uimsbf
            sub_carrier                                              1   uimsbf
            burst_amplitude                                          7   uimsbf
            sub_carrier_phase                                        8   uimsbf
        }
        pan_horizontal_left_upper_offset                            16   uimsbf
```

TABLE 1-continued

```
    pan_vertical_left_upper_offset                                   16  uimsbf
    if (sscalable || fscalable) {
        overlap_horizontal_left_upper_offset                         17  simsbf
        overlap_vertical_left_upper_offset                           17  simsbf
    }
    intra_dc_precision                                                2  uimsbf
    qscale_type                                                       1  uimsbf
    while(nextbits0!= '0000 0000 0000 0000 0000 0001' ) {
        picture_extension_data                                        8
    }
    next_start_code0
}
if (nextbits0==user_data_start_code) {
    user_data_start_code                                             32  bslbf
    while(nextbits0!= '0000 0000 0000 0000 0000 0001' ) {
        user_data                                                     8
    }
    next_start_code0
}
do {
    slice 0
    if (fscalable || sscalable ) {
        while(nextbits0==slave_slice_start_code) {
            slave_slice0
        }
    }
} while(nextbits0==slice_start_code)
}
```

TABLE 2

| | |
|---|---|
| 11 | Frame-Picture |
| 01 | Field 1 of a Field-Picture |
| 10 | Field 2 of a Field-Picture |
| 00 | reserved |

What is claimed is:

1. A picture data encoding method for encoding frame signals, each of said frame signals composed of a first field and a second field, the first and second fields being interlaced, comprising the steps of:

deciding if encoding of a frame signal is to be executed on a field-by-field basis or on a frame-by-frame basis;

generating encoded picture data when execution on the field-by-field basis is decided by encoding a field composed of a plurality of macro-blocks constituted solely by the first field of said frame signal, and subsequently encoding a field composed of a plurality of macro-blocks constituted solely by the second field of said frame signal;

generating encoded picture data when execution on the frame-by-frame basis is decided by encoding a frame composed of at least one macro-block which includes both components of the first field of said frame signal and components of the second field of said frame signal; and appending discrimination data to said encoded picture data based on the results of the decision, said discrimination data indicating if said encoded picture data have been encoded on the field-by-field basis or on the frame-by-frame basis, wherein said encoded picture data has a hierarchical structure and wherein said discriminating data is provided at a portion of a header of a predetermined hierarchical layer of said encoded picture data.

2. The picture data encoding method as claimed in claim 1 wherein the executed decision is based on motion vectors of at least one of the pluralities of macro-blocks.

3. A picture data encoding method for encoding frame signals, each of said frame signals composed of a first field and a second field, the first and second fields being interlaced, comprising the steps of:

generating encoded picture data by encoding a field composed of a plurality of macro-blocks constituted solely by the first field of said frame signal, and subsequently encoding a field composed of a plurality of macro-blocks constituted solely by the second field of said frame signal; and appending to said encoded picture data discrimination data indicating that said encoded picture data have been encoded on a field-by-field basis, wherein said encoded picture data has a hierarchical structure and wherein said discriminating data is provided at a portion of a header of a predetermined hierarchical layer of said encoded picture data.

4. A picture data encoding method for encoding frame signals, each of said frame signals composed of a first field and a second field, the first and second fields being interlaced, comprising the steps of:

generating encoded picture data by encoding a frame composed of components of the first field of the frame signal and the second field of the frame signal; and appending discrimination data indicating that said encoded picture data have been encoded on a frame-by-frame basis, wherein said encoded picture data has a hierarchical structure and wherein said discriminating data is provided at a portion of a header of a predetermined hierarchical layer of said encoded picture data.

5. A picture data decoding method for decoding picture data produced by encoding frame signals, each of said frame signals composed of a first field and a second field, the first and second fields being interlaced, comprising the steps of:

detecting a flag provided at a portion of a header for said picture data for discriminating if the picture data have been encoded on a field-by-field basis or on a frame-by-frame basis;

independently reproducing said first field and said second field when the field-by-field basis is detected by decoding a portion of the picture data corresponding to a field composed of a plurality of macro-blocks constituted solely by a first field of said frame signal, and subsequently decoding a portion of the picture data corresponding to a field composed of a plurality of macro-blocks constituted solely by a second field of said frame signal; and reproducing said first field and said second field together when the frame-by-frame basis is detected by decoding a portion of the picture data corresponding to both said first field and said second field of said frame signal, wherein said picture data has a hierarchical structure, said flag is detected from a header of a predetermined hierarchical layer of said picture data, and wherein detecting one of the field-by-field basis and the frame-by-frame basis is performed for each of predetermined hierarchical layers.

6. A picture data decoding method for decoding picture data produced by encoding frame signals, each of said frame signals composed of a first field and a second field, the first and second fields being interlaced, comprising the steps of:

detecting a flag provided at a portion of a header for said picture data for discriminating if the picture data have been encoded on a field-by-field basis; and decoding the picture data based on said flag on the field-by-field basis by independently reproducing said first field and said second field when the field-by-field basis is detected by decoding a portion of the picture data corresponding to a field composed of a plurality of macro-blocks constituted solely by a first field of said frame signal, and subsequently decoding a portion of the picture data corresponding to a field composed of a plurality of macro-blocks constituted solely by a second field of said frame signal wherein said picture data has a hierarchical structure, and wherein said flag is detected from a header of a predetermined hierarchical layer.

7. A picture data decoding method for decoding picture data produced by encoding frame signals, each of said frame signals composed of a first field and a second field, the first and second fields being interlaced, comprising the steps of:

detecting a flag provided at a portion of a header for said picture data for discriminating if the picture data have been encoded on a frame-by-frame basis; and decoding the picture data based on said flag on the frame-by-frame basis by reproducing said first field and said second field together when the frame-by-frame basis is detected by decoding a portion of the picture data corresponding to both said first field and said second field of said frame signal, wherein said picture data has a hierarchical structure, and wherein said flag is detected from a header of a predetermined hierarchical layer.

8. A picture data encoding device for encoding frame signals with a block consisting in a two-dimensional array of plural pixels as an encoding unit, each of said frame signals composed of a first field and a second field, the first field being interlaced, comprising:

decision means for deciding if encoding of said frame signals is to be executed on a field-by-field basis or on a frame-by-frame basis;

means for generating encoded picture data when execution on the field-by-field basis is decided by encoding a field composed of a plurality of macro-blocks consisting in a two-dimensional array of plural pixels constituted solely by the first field of said frame signal, and for subsequently encoding a field composed of a plurality of macro-blocks consisting in a two-dimensional array of plural pixels constituted solely by the second field of said frame signal;

means for generating encoded picture data when execution on the frame-by-frame basis is decided by encoding a frame composed of at least one macro-block which includes both components of the first field of said frame signal and components of the second field of said frame signal; and appending means for appending discrimination data to said encoded picture data based on the results of decision, said discrimination data indicating if said encoded frame signal has been encoded on the field-by-field basis or on the flame-by-frame basis, wherein said encoded picture data has a hierarchical structure and wherein said discriminating data is provided at a portion of a header of a predetermined hierarchical layer of said encoded picture data.

9. The picture data encoding device as claimed in claim 8 wherein said appending means include a variable length encoding circuit.

10. A picture data encoding device for encoding frame signals with a block consisting in a two-dimensional array of plural pixels as an encoding unit, each of said frame signals composed of a first field and a second field, the first field being interlaced, comprising:

decision means for deciding if encoding of said frame signals is to be executed on a field-by-field basis or on a frame-by-frame basis;

means for generating encoded picture data when execution on the field-by-field basis is decided by encoding a field composed of a plurality of macro-blocks consisting in a two-dimensional array of plural pixels constituted solely by the first field of said frame signal, and for subsequently encoding a field composed of a plurality of macro-blocks consisting in a two-dimensional array of plural pixels constituted solely by the second field of said frame signal;

means for generating encoded picture data when execution on the frame-by-frame basis is decided by encoding a frame composed of at least one macro-block which includes both components of the first field of said frame signal and components of the second field of said frame signal;

appending means for appending discrimination data to said encoded picture data based on the results of decision, said discrimination data indicating if said encoded frame signal has been encoded on the field-by-field basis or on the frame-by-frame basis; and motion vector detecting means for detecting a motion vector between first and second fields of a current frame to be encoded, said decision means executing said decision based on the motion vectors of at least one of the pluralities of macro-blocks.

11. A picture data encoding device for executing block-based encoding of frame signals consisting in an interlaced two-dimensional array of pixels for generating encoded picture data having a hierarchical structure, comprising:

motion vector detecting means for detecting the motion vector between first and second fields of a current frame of said frame signals to be encoded, from one macro-block to another, decision means for deciding if encoding of said frame signals is to be executed on a field-by-field basis or on a frame-by-frame basis, based on the magnitude of a median of the motion vector from said motion vector detecting means, as found over a predetermined hierarchical layer, encoding means for encoding said frame signals on the field-by-field basis or on the frame-by-frame basis, based on the results of decision from said decision means, and variable length coding means for variable length encoding said encoded picture data and discriminating data indicating that said encoded picture data have been encoded on one of the field-by-field basis and the frame-by-frame basis, based on the results of decision from said decision means, and for appending said discriminating data to a header of a predetermined hierarchical layer of said picture data.

12. A picture data decoding device for decoding picture data produced by encoding frame signals, each of said frame signals composed of a first field and a second field, the first and second fields being interlaced, comprising:

detecting means for detecting a flag provided at a portion of a predetermined hierarchical layer of said picture data for indicating whether the picture contained in said hierarchical layer has been encoded on a field-by-field basis or on a frame-by-frame basis;

means for independently reproducing said first field and said second field when the field-by-field basis is detected by decoding a portion of the picture data corresponding to a field composed of a plurality of macro-blocks constituted solely by a first field of said frame signal, and subsequently decoding a portion of the picture data corresponding to a field composed of a plurality of macro-blocks constituted solely by a second field of said frame signal; and means for reproducing said first field and said second field together when the frame-by-frame basis is detected by decoding a portion of the picture data corresponding to both said first field and said second field of said frame signal.

13. The picture data decoding device as claimed in claim 12 further comprising display means for displaying the detection of one of the field-by-field basis and the frame-by-frame basis.

14. The picture data decoding device as claimed in claim 12 further comprising an inverse variable length coding circuit, said flag being discriminated by said inverse variable length coding circuit.

15. A picture data decoding device for decoding picture data encoded with a block consisting of a two-dimensional array of plural pixels as an encoding unit, comprising:

detecting means for detecting a flag provided at a portion of a predetermined hierarchical layer of said picture data for indicating whether the picture contained in said hierarchical layer has been encoded on a field-by-field basis or on a frame-by-frame basis;

decision means for deciding, based on said flag from said detecting means, whether or not decoding of said picture data is possible; and display means for displaying the results of the decision from said decision means.

16. The picture data decoding device as claimed in claim 15 further comprising an inverse variable length coding circuit, said flag being discriminated by said inverse variable length coding circuit.

17. A picture data decoding device for decoding picture data encoded with a block consisting in a two-dimensional array of plural pixels as an encoding unit, comprising:

detecting means for detecting a flag provided at a portion of a predetermined hierarchical layer of said picture data for indicating whether the picture contained in said hierarchical layer has been encoded on a field-by-field basis or on a frame-by-frame basis; and decoding means for decoding said picture data by selecting, for each of hierarchical layers, one of field-based decoding and frame-based decoding depending on the flag from said detecting means.

18. The picture data decoding device as claimed in claim 17 further comprising:

an inverse variable length coding circuit, said flag being discriminated by said inverse variable length coding circuit.

19. A picture recording medium having recorded thereon encoded interlaced picture data encoded on the field-by-field basis or on the frame-by-frame basis in a hierarchical layer, and discriminating data provided at a header of a predetermined one of said hierarchical layers for indicating whether the encoded picture data have been encoded on the field-by-field basis or on the frame-by-frame basis.

* * * * *